United States Patent [19]

Kay et al.

[11] Patent Number: 5,357,513
[45] Date of Patent: Oct. 18, 1994

[54] TRANSMISSION POWER LEVEL ADJUSTMENT IN RADIO TELEPHONY

[75] Inventors: Stanley E. Kay, Rockville; John E. Corrigan, III, Chevy Chase; Daniel R. Wendling, Darnestown; Ashok D. Mehta, North Potomac, all of Md.; Michael I. Parr, San Diego, Calif.

[73] Assignee: Hughes Aircraft Company, Los Angeles, Calif.

[21] Appl. No.: 118,553

[22] Filed: Sep. 9, 1993

Related U.S. Application Data

[63] Continuation-in-part of Ser. No. 622,232, Dec. 6, 1990, Pat. No. 5,299,198.

[51] Int. Cl.$^5$ .................................. H04J 3/16
[52] U.S. Cl. .................................. 370/95.3; 455/33.1
[58] Field of Search .................. 370/95.3, 77, 104.1, 370/60, 94.1, 58.1; 455/33, 33.1, 33.2, 33.3, 33.4, 103, 214, 56.1, 54.1, 54.2, 67.3, 67.6, 63, 126, 69

[56] References Cited

U.S. PATENT DOCUMENTS

| | | | |
|---|---|---|---|
| 5,056,109 | 10/1991 | Gilhousen et al. | 455/69 |
| 5,129,098 | 7/1992 | McGirr et al. | 455/69 |
| 5,220,678 | 6/1993 | Feei | 455/69 |
| 5,241,690 | 8/1993 | Larsson et al. | 455/69 |
| 5,265,119 | 11/1993 | Gilhousen et al. | 455/54.1 |

*Primary Examiner*—Douglas W. Olms
*Assistant Examiner*—Shick Hom
*Attorney, Agent, or Firm*—Gordon R. Lindeen, III; William J. Streeter; Wanda K. Denson-Low

[57] ABSTRACT

A mobile telephone system multiplexes plural voice traffic channels on a single carrier using a TDMA protocol. The capacity of the mobile telephone system is increased by assigning voice traffic capacity, not on a conversation basis, but on a speech spurt basis. Accordingly, delays of undetermined duration may occur between subsequent information bursts which correspond to the transmission of speech spurts. An adjustment request regarding the power with which the information bursts are transmitted from a transmitting station to a receiving station is generated by detecting an information burst transmission at the receiving station, measuring the time which elapses following the transmission, and comparing the elapsed time with a predetermined threshold value. If the elapsed time exceeds the threshold, a further transmission is requested from the transmitting station notwithstanding the availability of any information to transmit. The power of the transmission received in response to the request is measured and a control message for requesting an adjustment to the transmission power level in response to the measurement is transmitted to the transmitting station.

11 Claims, 33 Drawing Sheets

FORWARD FRAMES

| | SLOT 1 | SLOT 2 | SLOT 3 | SLOT 4 | SLOT 5 | SLOT 6 |
|---|---|---|---|---|---|---|
| FRAME 1 | MS 15 | MS 11 | MS 21 | MS 4 | MS 1 | MS 22 |
| 2 | MS 15 | MS 11 | MS 21 | MS 4 | | MS 22 |
| 3 | MS 15 | MS 11 | MS 21 | MS 4 | MS 19 | MS 22 |
| 4 | MS 15 | | MS 21 | MS 4 | MS 19 | MS 22 |
| 5 | MS 15 | MS 8 | MS 21 | MS 4 | MS 19 | MS 22 |
| 6 | MS 15 | MS 8 | | MS 4 | MS 19 | |
| 7 | MS 2 | MS 8 | | MS 4 | MS 19 | |
| 8 | MS 2 | MS 8 | MS 32 | MS 4 | MS 19 | |
| 9 | MS 2 | MS 8 | MS 32 | MS 4 | MS 19 | MS 15 |

ONE DSI GROUP
12 RF CHANNELS
72 SLOTS
6 CONTROL SLOTS
66 USER SLOTS

FIG. 4.

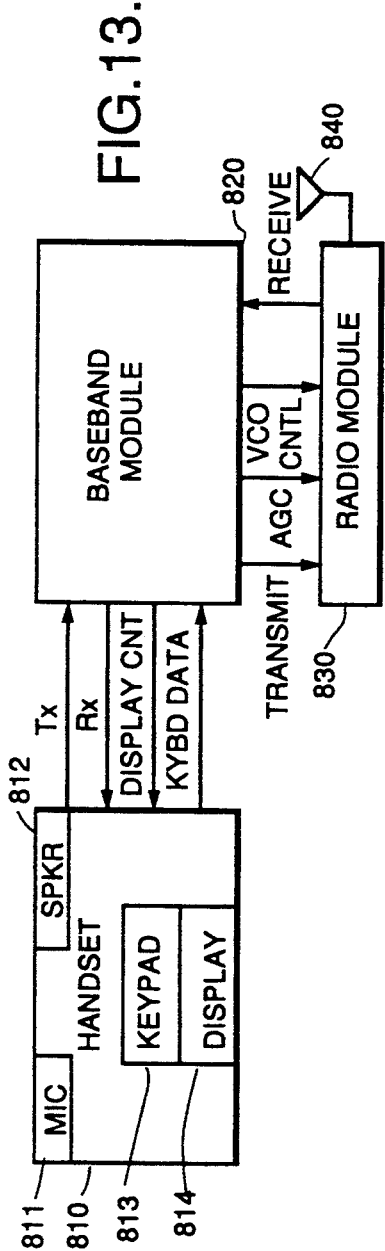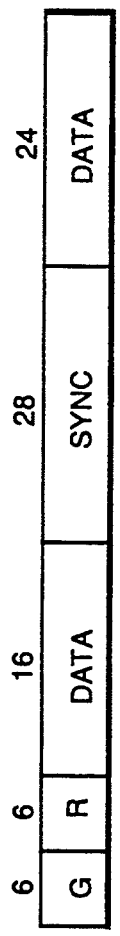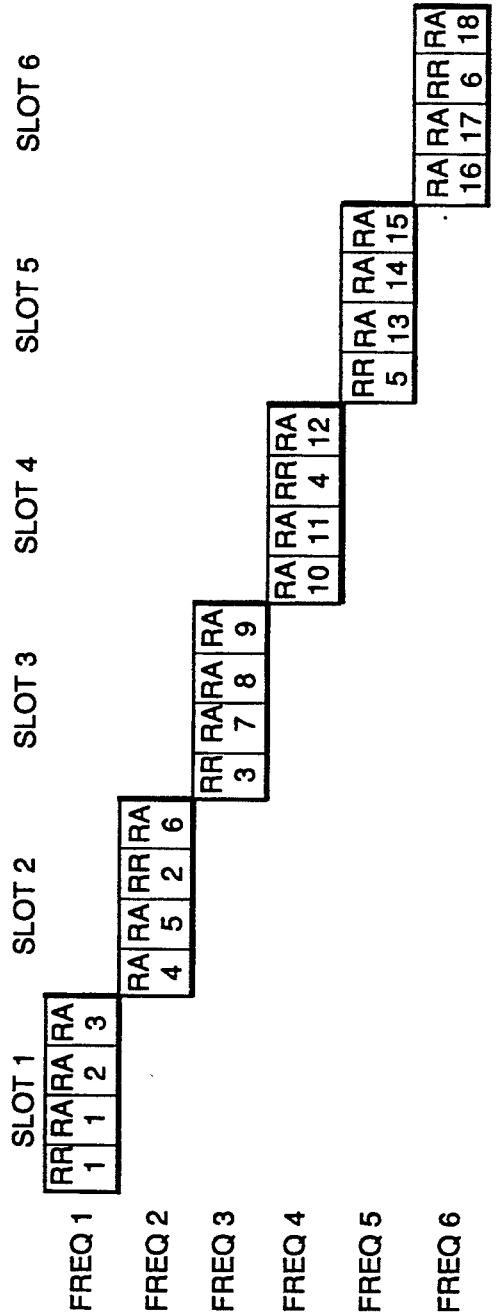
FIG. 13.
FIG. 14.
FIG. 15.

FIG. 33.

| | S/D | CAC | ENCODER | CU | MSP | SLOT USAGE | COMMENTS |
|---|---|---|---|---|---|---|---|
| 1 | | | | | | | |
| 2 | | | | | | | Start of speech Speech Detect -5msec |
| 3 | | | | | | | Fwd Alloc Req to CAC Queued in CAC |
| 4 | | | | | | | CAC Processing |
| 5 | | | 1 | | | | Fwd Asgn to CU |
| 6 | | | 2 | | | FC | Fwd Asgn to mobile |
| 1 | | | 3 | | | Redundant FC | |
| 2 | | | | | | Redundant FC | |
| 3 | | | | | | | |
| 4 | | | | | | RR | Fwd Asgn Ack |
| 5 | | | | | | | |
| 6 | | | | | | FV | First speech frame in air |
| 1 | | | | | | | |
| 2 | | | | | | | |
| 3 | | | | | | | |
| 4 | | | | | | | |
| 5 | | | | | | | |
| 6 | | | | | | FV | |
| 1 | | | | | | | |
| 2 | | | | | | | |
| 3 | | | | | | | |
| 4 | | | | | | | |
| 5 | | | | | | | |
| 6 | | | | | | | |

FIG. 35.

| | S/D | CAC | ENCODER | CU | MSP | SLOT USAGE | COMMENTS |
|---|---|---|---|---|---|---|---|
| 1 | | | | | | FV(VF last-1) | Dealloccate old mobile |
| 2 | | | | →=Deallocating mobile | | | Dealloccate to CAC |
| 3 | 8 msec | | | →=Allocating mobile | | | CAC Processing deallocate |
| 4 | | | VFlast | | | | Speech activity detected |
| 5 | | | | | | | |
| 6 | | | 1 | | | | |
| 1 | | | 2 | | | FV (VF last) / FC (new) | Fwd Asgn to new mobile |
| 2 | | | 3 | | | Redundant FC | |
| 3 | 8 msec | | | | | Redundant FC | |
| 4 | | | VF-1 | | | | |
| 5 | | | | | | RR | Fwd Asgn Ack to CU |
| 6 | | | | | | | |
| 1 | | | | | | FV (VF1) | |
| 2 | | | | | | | |
| 3 | | | | | | | |
| 4 | | | | | | | |
| 5 | | | | | | | |
| 6 | | | | | | | |
| 1 | | | | | | FV (VF2) | |
| 2 | | | | | | | |
| 3 | | | | | | | |
| 4 | | | | | | | |
| 5 | | | | | | | |
| 6 | | | | | | | |

FIG. 36.

| | S/D | MSP | ENCODER | CU | CAC | SLOT USAGE | COMMENTS |
|---|---|---|---|---|---|---|---|
| 1 | VFlast | | VFlast-1 | | | | |
| 2 | VFlast | | | | | | |
| 3 | | 8 msec | | | | | Start of speech |
| 4 | | | Buffer | | | | |
| 5 | VF1 | | VFlast | | | | |
| 6 | | | VFlast | | | RV(VFlast-1) | |
| 1 | | | | | | | |
| 2 | | | | | | | Speech detect-30 msec |
| 3 | | 8 msec | | | | | Mobile Processing |
| 4 | VF2 | | Req1 | | | RC | Request |
| 5 | | | Buffer Req2 | | | Redundant RC | Redundant Request |
| 6 | | | Req3 | | | Redundant RC  RV | Redundant Request CAC Proc. VFlast to |
| 1 | | | VF1 | | | | deallocating mobile CAC Processing |
| 2 | | | | | | FC | |
| 3 | | | | | | Redundant FC | |
| 4 | VF3 | 8 msec | Buffer | | | Redundant * FC | |
| 5 | | | | | | Redundant * FC | Mobile Processing |
| 6 | | | | | | RV ( Req 1 ) Redundant FC | First speech frame ( best case) |
| 1 | | | | | | RV (Req 2) * | |
| 2 | | | | | | RV (Req 3) * | |
| 3 | | 8 msec | | | | | |
| 4 | VF4 | | | | | | |
| 5 | | | | | | | |
| 6 | | | * occurs only under conditions of missed REV Control message | | | | |

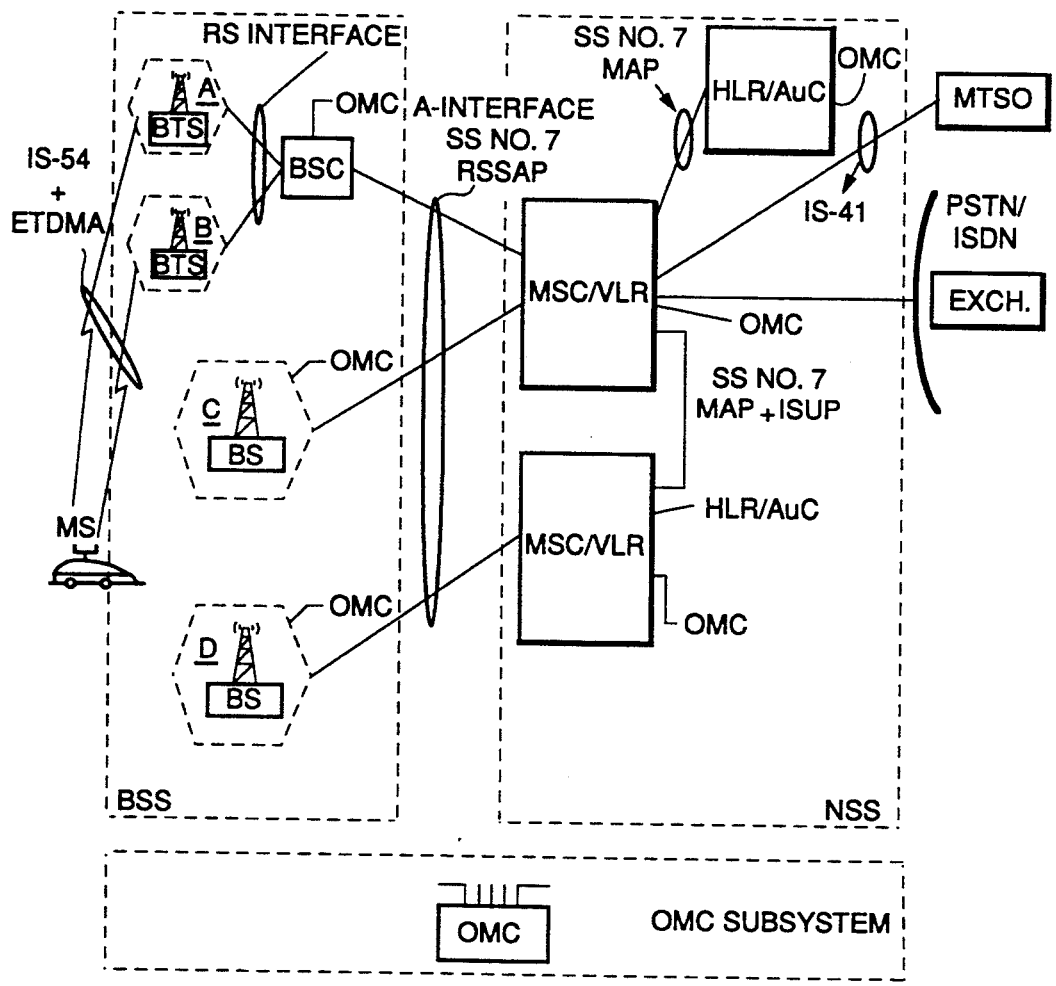

MSC  MOBILE SWITCHING CENTER
HLR  HOME LOCATION REGISTER
AuC  AUTHENTICATION CENTER
VLR  VISITOR LOCATION REGISTER
PSTN  PUBLIC SWITCHED TELEPHONE NETWORK
ISDN  INTEGRATED SERVICES DIGITAL NETWORK
MAP  MOBILE APPLICATION PART ( SS. NO. 7 )
BS  BASE STATION
BSC  BASE STATION CONTROLLER
MS  MOBILE STATION
OMC  OPERATIONS & MAINTENANCE CENTER
ISUP  ISDN SUBSCRIBER USER PART ( SS. NO. 7 )
RS  RADIO SUBSYSTEM
BSS  BASE STATION SUBSYSTEM
NSS  NETWORK SUBSYSTEM

BTS  BASE TRANSCEIVER STATION
MTSO  MOBILE TELEPHONE SWITCHING OFFICE

FIG. 37.

TRANSMISSION POWER LEVEL ADJUSTMENT IN RADIO TELEPHONY

CROSS REFERENCE TO RELATED APPLICATIONS

This application is a division of U.S. patent application Ser. No. 07/622,232 filed Dec. 6, 1990 and now U.S. Pat. NO. 5,299,198 assigned to the same assignee as the present invention.

TECHNICAL FIELD

The invention relates to radio communications, and more particularly, to the provision of telephone service over radio frequency links to mobile stations, i.e., mobile telephone service.

BACKGROUND ART

Mobile telephone service using radio frequency transmission began here in the late 1970's. Initially, service was based on analog (FM) radio transmission for voice and Frequency Shift Keying (FSK) modulation, along with pre-assigned analog channels for control and signaling. ESS switching and standard trunking technology was utilized to provide access to and from the Public Switched Telephone Network (PSTN). This technology is commonly referred to as Advanced Analog Mobile Phone System (AMPS). A typical AMPS system consists of a Mobile Telephone Switching Office (MTSO) which controls a set of cell sites or base stations. The MTSO and cell sites communicate over standard voice trunks as well as dedicated control data links. The MTSO functions include standard local switching and call processing, radio channel management, location and handoff of mobile stations, billing, traffic measurements, service orders, trunk administration and system maintenance. The cell sites, on the other hand, provide for call set-up, supervision and termination, call handoff to/from adjacent cells as directed by the MTSO, protocol conversation from MTSO data links to an air (radio) interface, mobile location, remotely ordered testing, control and reconfiguration, RF (Radio Frequency) modulation/demodulation and transmission/reception and voice processing. An overview of AMPS is found in the *Bell System Technical Journal*, Vol. 58, No. 1, January 1979.

In 1987, through its working group, Groupe Special Mobile (GSM), the organization of the European PTTs (CEPT) adopted a new standard for a unified, pan-European digital cellular mobile radio communications system. This standard is commonly referred to as GSM. The basic building blocks of the GSM model include a network subsystem whose main component is a Mobile Switching Center (MSC) which is connected, on the one hand, to the PSTN and, on the other hand, to a base station subsystem. The base station subsystem comprises one or more base stations where each base station includes access to at least one Base Station Controller (BSC) and one or more Base Transceiver Stations (BTS). The BSC is responsible for performing cell management, channel management and intra-BSC handoffs. The network subsystem (NSS) is composed primarily of a standard ISDN switching system, called the Mobile Switching Center (MSC). The BSC interfaces with the MSC for implementing inter-BSC handoffs. The two main functions of the MSC are to act as a gateway into the PSTN and to interface with several mobile specific components of the network subsystem, including an authentication center, an equipment identity register and an operations and maintenance center.

In the United States, the Telecommunications Industry Association (TIA) is in the process of adopting a set of standards for migrating the current analog (AMPS) system to a dual mode operating environment in which a digital cellular network will co-exist with the present analog service. This collection of new standards is loosely referred to as AMPS-D. AMPS-D will subdivide existing air (radio channels) into six TDMA (Time Division Multiple Access) slots over which voice and control data will be transmitted. The $\pi/4$ DQPSK (Differential Quadrature Phase Shift Keying) modulation scheme will be used. The standard supports use of two time slots per frame to achieve full-rate coded voice transmission at approximately an 8 Kbps (Kilobits per Second) rate. Support for half-rate voice (4.8 Kbps) using a single TDMA slot per frame is also envisioned. Half rate voice will provide approximately a 6:1 overall capacity gain over AMPS. The reference model used for AMPS-D is a derivative of the GSM architecture. There are, however, some major differences in the operation of the two systems. The most significant difference lies in the air (radio) interface between the mobile terminal and the base station equipment. Unlike GSM, which uses a dedicated channel for signaling between the mobile and the BTS, AMPS-D uses control messages embedded within the traffic channels to perform call-related functions. To remain compatible with AMPS, though, a common analog channel is also used for the initial phase of call setup (until the type and capability of the mobile station is determined). The air (radio) interface for AMPS-D is documented in the TIA standard IS-54. These terms (AMPS-D and IS-54) thus refer to the same air (radio) interface.

Several manufacturers have formed consortia to provide GSM systems in time for deployment in the 1991 time frame. Among these is a group called European Cellular Radio Consortium, or simply, ECR. ECR is producing a number of GSM-compatible subsystems that can be packaged and marketed in various combinations, and in conjunction with each of the switching systems of the member companies.

Experience since the introduction of the mobile telephone service has revealed that an overriding difficulty with the service is the provision of sufficient capacity to meet the demand. This is the reason, for example, for implementing the new IS-S4 standard, providing for a 6:1 capacity gain over conventional AMPS. Notwithstanding this improvement, it should be apparent that the ability to provide for additional capacity, over and above that provided in the IS-54 standard, would be extremely valuable.

Techniques are available for exploiting the silent intervals in voice conversations to increase transmission capacity. These systems are referred to as Time Assigned Speech Interpolation (TASI), Digital Speech Interpolation (DSI) and by other terms. TASI was originally introduced to increase the capacity of underwater telephone transmission systems. Campanella, in "Digital Speech Interpolation", from the *COMSAT Technical Review*, Vol. 6, No. 1, Spring 1976, at pages 127 et seq., describes the use of these techniques in satellite communications. Others have proposed using these techniques in the mobile telephone service, see Al-Salihi, "The Application of Time Assignment Speech Interpolation (TASI) to the Radio Phone Service", from the 1980 *Colloquium on Radio System Organization and Control*; Riordon, "Demand Time-Assigned Speech Interpolation for Land Mobile Systems", from *International Conference—Mobile Radio Systems and Techniques* (1984); Nguyen, "Access Strategies for D-TASI Over Mobile Radio Channels", from the *IEEE Vehicular Technology Conference* (1986); and Sheikh, "Performance of Access Strategies for D-TASI Over Mobile Radio Fading Channels", from the *Journal of the Institution of Electronic and Radio Engineers*, Vol. 57, No. 6 (1987). More recently, Goodman, in "Packet Reservation Multiple Access for Local Wireless Communications", from the *IEEE Transactions on Communications*, Vol. 37, No. 8, August 1989, describes Packet Reservation Multiple Access (PRMA), which he indicates closely resembles TDMA. Goodman notes "[T]he task of implementing time assignment speech interpolation in a TDMA system with dispersed wireless terminals appears prohibitively complex."

SUMMARY OF THE INVENTION

It is an object of the present invention to provide capacity for the mobile telephone service beyond that envisioned by IS-54. More particularly, it is an object of the present invention to exploit the inactive periods, which are a large portion of any telephone conversation, in order to increase the capacity of the system. It is a more specific object of the invention to assign transmission (radio) capacity to a mobile user only when a voice signal is available for transmission to or from that mobile.

In accordance with the present invention, the base station subsystem of a mobile telephone system operates in accordance with a Time Division Multiple Access (TDMA) protocol. Each base station manages a pool of duplex transmission channels. The pool consists of a plurality of different carrier frequencies, each of which are time divided to provide a repeating frame consisting of a number of slots. With six slots per frame (as in the IS-54), and for twelve duplex RF channels, 72 slots are provided in each direction. In accordance with a preferred embodiment, up to 66 sets of the slots are used for voice traffic and six sets of slots or more are used for control information (call set up, signaling, etc.). The number of control slots per frame may be varied in light of traffic levels.

A mobile-initiated call will go through conventional call set up procedures to identify the calling mobile to the base station and to initiate an attempt through the PSTN to reach the called destination. When the call has been completed and either the calling or called party actually begins to speak, voice traffic capacity is assigned on a dynamic basis. Both the mobile and the base stations include a speech detector, and the following sequence of events occurs when the mobile speech detector detects the onset of a speech spurt:

(1) The mobile station formulates a channel allocation request and transmits that request, in one of the control slots, to the base station. For reasons which are explained later, this transmission is repeated a number of times, so that the transmission is protected by time diversity. In addition, different repetitions of the transmission will occur on different carrier frequencies, so that the transmission is protected by frequency diversity. Furthermore, the power level of the different transmissions is also altered so that the transmission is protected by power diversity.

(2) When the base station receives such a request, a search is conducted of available transmission capacity or available traffic slots within the pool. The pool, of course, is divided between forward (that is base to mobile) and reverse (mobile to base) directions and the search is conducted within the appropriate half of the pool. For a speech spurt detected at a mobile, the reverse pool is searched. On locating an available channel, the channel is made busy to the pool and the base station implements a transmission to the mobile, identifying the located channel. Identification requires both carrier frequency identification and slot number identification. This identification is protected by time and frequency diversity, i.e., it is transmitted on multiple different occasions, at different carrier frequencies.

(3) On reception of the channel identification, the mobile tunes its transmitter to the identified channel (selected carrier frequency and slot) and begins transmitting the speech spurt. During the time between the transmission of the allocation request and reception of the identification, voice processing is carried out at the mobile station, i.e. the voice signal from the user is digitized, coded and stored for transmission. Upon receipt of the appropriate channel identification, transmission is initiated in the TDMA format and the mobile will occupy the identified channel for the duration of the speech spurt, and that duration only. In other words, in contrast to certain prior art mobile telephone systems, the mobile is not permanently assigned a channel for the duration of the conversation. Rather, taking advantage of DSI techniques, each different speech spurt is assigned a channel at the time it occurs.

(4) When the speech detector at the mobile station detects the termination of the speech spurt, a further transmission is made requesting de-allocation of the traffic channel. In contrast to the allocation request message, which was transmitted on a control channel, the de-allocation message is embedded in the same traffic slot as are the last several packets of the speech spurt. Since the base station also includes a speech detector, detection of speech spurt termination at both mobile and base are used to eliminate the necessity for a dedicated reverse control channel message indicating the end of a speech spurt. The processing delay at the mobile allows detection of speech spurt termination at the mobile before the last speech spurt packet is transmitted so that the indication of spurt termination can be included in the last two (for example) speech packets.

(5) On receipt of the de-allocation request at the base station, the channel that had been assigned to the mobile is released back to the pool of available traffic channels.

Similar processing occurs when the base station detects the presence of a speech spurt originating at the PSTN. In contrast to speech spurts originated at the mobile, speech spurts initiated at the PSTN require the base station to transmit to the mobile (once an available channel has been identified), the identification of the forward channel (from base to mobile) to which the mobile should tune for receiving the speech spurt. Likewise, when the speech spurt originated at the PSTN terminates, the base station transmits an indication to the mobile that it need no longer monitor the traffic channel.

In one embodiment in a radio telephony system having a plurality of transmitting stations, where each station transmits information bursts to another station on radio carrier frequencies divided into time slots and where delays of undetermined duration may occur between subsequent information bursts, the invention encompasses a method for generating an adjustment request regarding the power with which the information bursts are transmitted from a transmitting station to a receiving station. The method involves the steps of detecting an information burst transmission at the receiving station, measuring the time which elapses following the transmission, and comparing the elapsed time with a predetermined threshold value.

If the elapsed time exceeds the threshold, a further transmission is requested from the transmitting station notwithstanding the availability of any information to transmit. The method further involves measuring the power of the transmission received in response to the request, and transmitting to the transmitting station a control message for requesting an adjustment to the transmission power level in response to the measurement.

BRIEF DESCRIPTION OF THE DRAWINGS

The present invention will now be further described in the following portions of this specification when taken in conjunction with the attached drawings in which:

FIG. 4 shows an exemplary DSI group or pool illustrating allocation of several of the channels and slots for control purposes according to the present invention;

FIG. 13 is a block diagram of a mobile telephone suitable for use with the present invention;

FIG. 14 illustrates a reverse control sub-slot according to the present invention;

FIG. 15 illustrates one arrangement for the frequency hopping of the reverse control slots such as that of FIG. 14;

FIG. 33 illustrates a forward channel assignment acknowledgment and traffic transmission;

FIGS. 35 and 36 illustrate the deallocate/reallocate for the reverse and forward directions, respectively;

FIG. 37 is a block diagram of an entire mobile telephone system suitable for use in accordance with the present invention;

DETAILED DESCRIPTION OF THE PREFERRED EMBODIMENT

Figure 1:
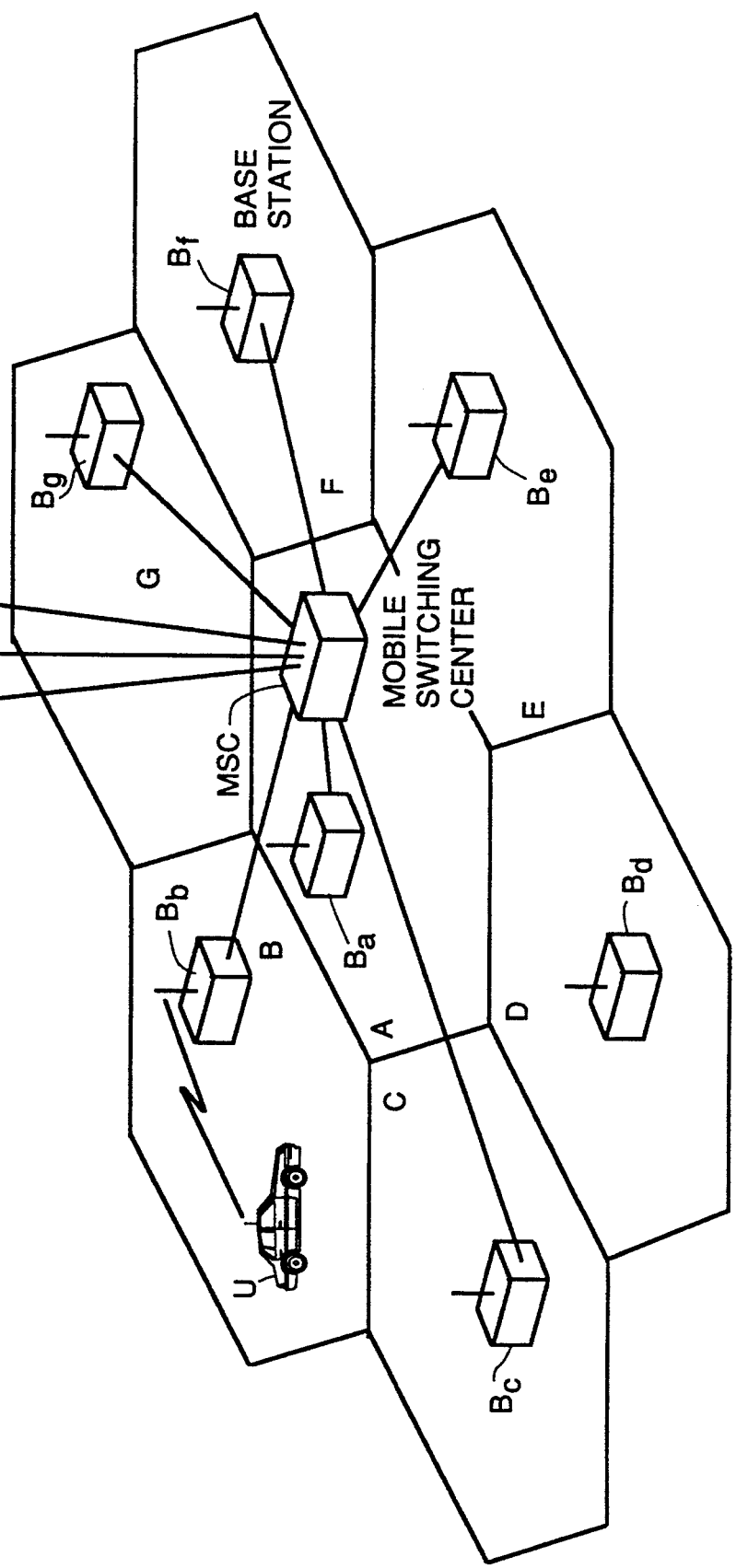
FIG. 1 is a schematic illustration of a typical mobile telephone system.

FIG. 1 is a schematic illustration of a typical mobile telephone system. The region encompassed by the service is divided into a number of cells (the figure shows cells A through G, although those skilled in the art will understand that the number of cells is merely illustrative). A mobile user, such as the user U, can be connected into the PSTN over the concatenation of an air (radio) link between the user U and a base station, and a wire link between the base station and a Mobile Switching Center (MSC). FIG. 1 shows that each cell A–G includes an associated base station $B_a$–$B_g$. The Mobile Switching Center MSC is connected in turn to the PSTN or the telephone network. FIG. 1 is generic, i.e. it is descriptive of AMPS, GSM, the AMPS-D or a system in accordance with the present invention. For application to AMPS the MSC would be called a Mobile Terminal Switching Office (MTSO) rather than MSC. The AMPS-D is arranged to provide compatible analog and digital protocols. The digital portion of AMPS-D uses a TDMA protocol, and while the present invention is also a TDMA variant, the present invention will be referred to as the E-TDMA ®system, E-TDMA ® is a trademark of the Hughes Aircraft Company. The key benefits of the E-TDMA system are:

(1) increased capacity, increased by a factor of 10 or more over the analog AMPS;
(2) reduced interference in the reverse channel occasioned by exploiting speech spurt and dynamic assignments, which leads to geographically averaged rather than worst case interference scenarios;
(3) discontinuous transmission (DTX) forward channel operation at roughly 65% duty cycle, leading to lower interference environments;
(4) lower cost per subscriber;
(5) implicit frequency hopping provides greater resistance to selective fading than the IS-54 fixed frequency system;
(6) early establishment of voice circuits using the DSI capability without wasting system capacity until actual voice begins;
(7) compatibility with IS-54 frame structure and straight-forward adaptation to half-rate coding;
(8) achieving capacity enhancement over the entire coverage area independent of geographic distribution of the mobiles, propagation exponent or shadowing variances;
(9) enhanced capacity vs. signal quality management flexibility by allowing all of the channels in a DSI pool to suffer minimal degradation as an external mobile is handed into the pool;
(10) minimizing the number of T1 lines connecting cell sites to the MSC based both on half rate coding and the advantage gained by using DSI;
(11) operator-controlled capacity vs. voice quality trade-offs by temporarily over-loading the DSI pool in times of heavy local loading;
(12) lower power requirements for Class A cell site amplifiers;
(13) inherent DTX capability at the mobile; and
(14) soft failures since the loss of a channel unit will generally not cause the loss of a call, only some decrease in voice quality averaged over a population of mobiles.

Figures 2, 3:
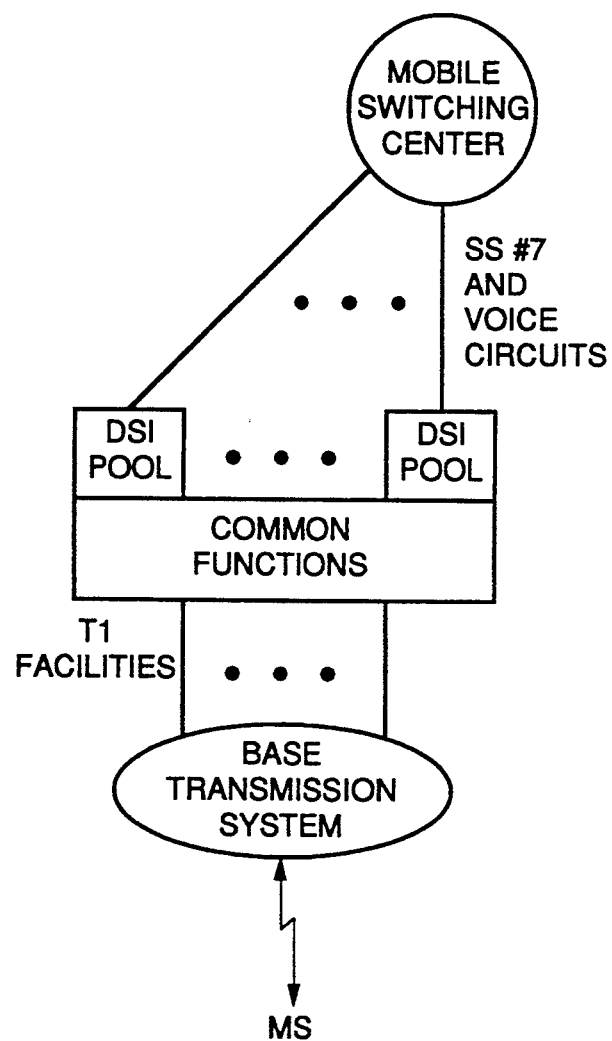
FIG. 2 illustrates an example of the traffic that could be carried in different traffic slots of sequential frames in an assignment made according to the present invention.
FIG. 3 shows the location of a DSI pool and its management relative to the base station and the MSC.

DSI provides capacity gain or advantage by exploiting the make-up of natural speech. Natural speech comprises active periods and quiet periods, which are also called spurts and pauses. Spurts are generally syllables and words, while pauses include the time in a conversation when a party is listening. In a typical conversation, a speech spurt lasts between one and two seconds and the activity factor is about 40%. Using 1.5 seconds as an average speech duration, a typical conversation includes speech spurts of 1.5 seconds duration, followed by pauses of typically 2.25 seconds duration, providing a 0.4 voice activity factor. The advantage of the present invention is gained by using the pause and listening time in one conversation by filling it with speech spurts from other conversations. In a dual mode (analog mode and digital mode) mobile telephone system, selected RF channels are set aside for digital operation. In the E-TDMA system, each of the six slots (per IS-54) on a TDMA carrier frequency operates as a half rate voice channel providing six times the basic analog capacity. Unlike the IS-54 dual mode system, however, mobiles are not assigned a time slot for the duration of a call. Rather, they are assigned a slot only when they have active speech spurts, as shown for example in FIG. 2. FIG. 2 shows nine TDMA frames (numbered at the left 1–9) and, horizontally across the figure, the six different slots per frame. In the example shown in FIG. 2, mobile stations identified as MS1, MS2, MS4, MS8, MS11, MS15, MS19, MS21 and MS22 occupy transmission capacity at different points in time. Focusing on slot 1, for example, it is apparent that MS15 occupies slot 1 in frames 1 through 6, but in frames 7-9, the slot is occupied by MS2. In other words, a speech spurt which was transmitted in slot 1 of frames 1–6, terminated in frame 6 and the next speech spurt from mobile MS15 did not begin until frame 9, at which time it was assigned slot 6. While FIG. 2 is illustratively shown for the forward transmission direction (base to mobile), reverse channel (mobile to base) operations are similar. This feature of dynamically assigning traffic capacity to speech spurts rather than assigning traffic capacity to a mobile for the duration of a conversation thus is a point of distinction between the E-TDMA system as disclosed herein and AMPS-D or GSM. An example of the capacity enhancement can be implied from FIG. 2 by noting that in AMPS-D or GSM, slot 1 in frames 7 and 8 would have been dedicated to MS15 even though MS 15 was not originating any traffic in frames 7 and 8. In other words, the capacity of slot 1 in frames 7 and 8 would have been wasted. The fact that, in accordance with the present invention, slot 1 of frames 7 and 8 carried traffic from MS2 is an instance of the gain provided by use of the present invention.

Statistically, in a large group, the active number of mobile stations (in either the reverse or forward traffic direction) can be approximated by a normal distribution. The average number of active users is just the voice activity factor (VAF) times the total number of users assigned to the entire DSI pool. Clipping occurs when the number of active speech spuds exceeds the number of available voice slots or traffic channels. The amount of clipping is managed by controlling the number of users permitted to enter the pool. Little voice quality impairment is noticed when 2% or fewer of the total speech spurts have significant clips (where a significant clip is 40 ms or longer).

However, the advantage gained by the present invention is not without its costs. The radio channel (between the mobile and the base station) is characterized by fading, shadowing and interference. As with the IS-54 voice, these factors introduce some voice quality impairments. With the present invention, additional degradation is conceivable, arising from the requirement for dynamically assigning speech spurt allocations over the radio channel.

Fading is often characterized as either being flat or frequency selective. Flat fading can be mitigated by time diversity. The more serious frequency selective fading can be reduced by time and frequency diversity. According to measured data for urban areas, RMS (Root Mean Square) delay spreads of at least one μsec are typical. This delay spread will introduce some degree of frequency selectivity to the channel so that truly flat fading will rarely occur. Frequency selective fading can be mitigated by the use of time and frequency diversity, i.e., sending a message at different times on different frequencies. Therefore, according to the present invention, control messages are repeated several times on different frequencies to minimize the probability of losing a message and delaying a speech spurt assignment. Shadowing causes large variations in signal power over periods of seconds. If the shadowing is deep enough, it will cause complete loss and control messages will not succeed. Of course, in this situation the voice frames will not succeed either so the techniques of the present invention do not further impair signal quality over that which would occur using IS-54 methods. More typically, shadowing will simply bring the system closer to threshold, thus lessening the depth of Rayleigh fades needed to cause an outage. This effectively increases the length of Rayleigh fades and makes the diversity somewhat less effective. Frequency diversity and message repetition along with, in some cases, power diversity, can make the signaling channel more robust than the voice channel itself and thus control channels transmitted with diversity according to the present invention will not degrade performance. Shadowing and vehicle motion also introduce a requirement for power control. This is a normal IS-54 function but is somewhat more difficult to implement with bursty signals as with the E-TDMA system because the speech and associated control channels are discontinuous in both directions. As will be described, this function is addressed by having the mobile continuously measure the received power from its cell site and adjust the power between power control messages from the cell site.

The basic unit of the present invention system is the DSI pool. FIG. 3 shows that the DSI pools are located between the MSC, mobile switching center, and the cell site radio equipment. In the preferred embodiment described herein, each DSI pool can include up to 24 RF channels per direction. The DSI pools interface with the MSC via multiplex voice channels on a PCM (Pulse Code Modulation) carrier. Typically, signaling may be SS7. The DSI pools in turn are connected to the cell site radio equipment by T1 facilities or individual 64 Kbps lines depending on the particular site requirements.

Message exchanges (between mobile and base) take place over signaling or control channels between the mobile station (MS) and the base station controller (BSC). The BSC controls the DSI channel assignment process and monitors the mobile's power, timing and hand-off related activities. The MS interprets commands and informs the BSC of speech spurt occurrences. FIG. 4 is an example of a DSI group comprising 12 RF carriers, each with 6 slots per frame. As shown in FIG. 4, the different carrier frequencies are identified on the left-hand margin, and each slot includes its number. The total pool thus includes 72 slots, of which 6 are dedicated for control purposes, and are shaded in FIG. 4. Therefore, the pool has 66 user slots, i.e. for the transmission of traffic. Inasmuch as the pool is duplex, FIG. 4 shows control and traffic channels for one of the two directions and the other direction has an identical 6 control slots or channels and 66 voice traffic slots or channels. The use of 6 control slots per pool per direction is exemplary. Under certain circumstances, the number of control slots can be increased above the 6 control slots shown in FIG. 4.

The interface between the mobile station and the base station preferably supports each of the following:
digital channels:
  E-TDMA half rate forward traffic channel (FT),
  E-TDMA half rate reverse traffic channel (RT)
  E-TDMA forward control channel (FC),
  E-TDMA reverse control channel (RC),
  IS-54 full rate traffic channel
  IS-54 half rate traffic channel,
analog channels:
  forward analog control channel (FOCC),
  reverse analog control channel (RECC),
  forward analog voice channel (FVC),
  reverse analog voice channel (RVC).

Figure 5:
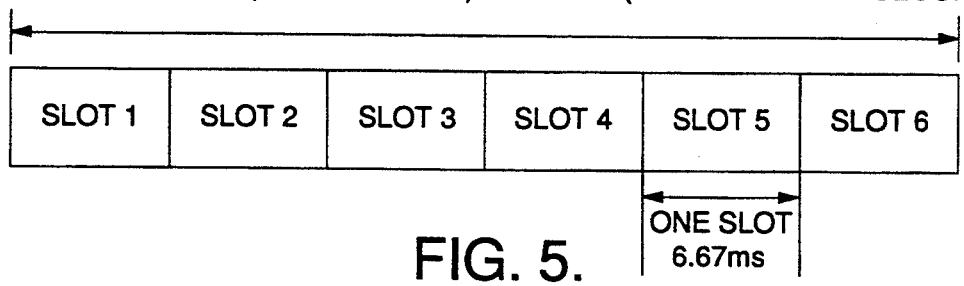
FIG. 5 illustrates an IS-54 frame showing its six slots.
Figure 6:
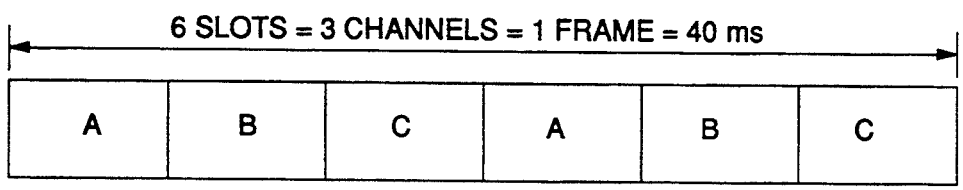
FIG. 6 illustrates a full rate coding application of the frame of FIG. 5.
Figure 7:
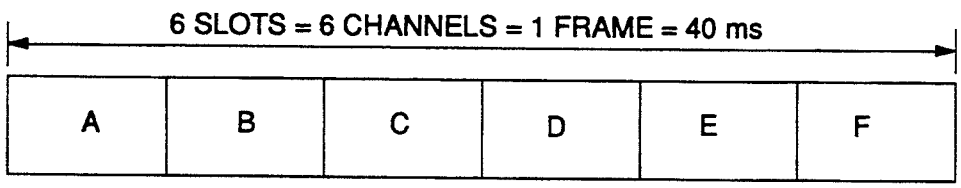
FIG. 7 illustrates a half rate coding application of the frame of FIG. 5.

The digital channels (the first six listed above) are made up of 40 ms TDMA frames, as shown in FIGS. 5, 6 and 7. The digital modulation is π/4 shifted differential QPSK (Quadrature Phase Shift Keying) at a symbol rate of 24.3 Ksps (Kilo Symbols per Second), and a bit rate of 48.6 Kbps. As shown in FIGS. 5, 6 and 7, a frame consists of six slots, each 324 bits long with a duration 2.5 of 6.67 ms. The IS-54 full rate channel uses two slots per frame (as shown in FIG. 6), allowing three digital voice channels per RF carrier frequency. The IS-54 half rate channels are implemented as shown in FIG. 7, providing for 6 channels or 6 slots per frame. The E-TDMA channel format is similar to that shown in FIG. 7, with the exception that the channel is only assigned to a user during speech activity. This allows multiple users to share common channels and results in an increase in capacity. The discontinuous use of E-TDMA channels requires signaling beyond the scope of what IS-54 requires; at least one additional control channel in both forward and reverse directions is necessary to handle the control signaling.

Figure 8:
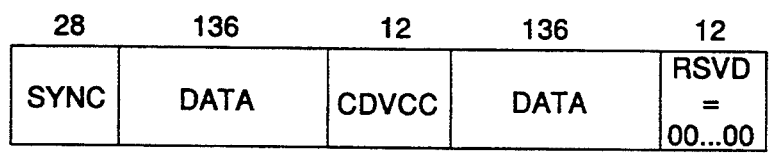
FIG. 8 illustrates an IS-54 forward traffic channel.
Figure 9:
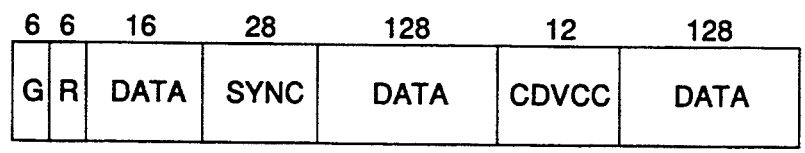
FIG. 9 illustrates an IS-54 reverse traffic channel.

FIGS. 8 and 9 show, respectively, the format of the forward and reverse traffic channels (FT, RT) under IS-54. The IS-54 specification defines the following fields, which are also used in the present invention:
G: guard time field
R: ramp time field
SYNC: 28 bit synchronization field
CDVCC: coded digital verification color code
RSVD: reserved The IS-54 specification also defines a Fast Access Control Channel (FACCH) and a Slow Access Control Channel (SACCH). The SACCH in IS-54 is used to send control messages at an average rate of one message every 11 frames. In IS-54, the SACCH is continuously present in the mobile transmission. The SACCH field is not used in this invention; the bits instead are assigned to the data field. The FACCH, in accordance with the present invention, is sent in lieu of the voice channel under certain circumstances. Unlike IS-54, the FACCH message is not necessarily interleaved, however, the FACCH rate encoding specified in IS-54 is adhered to herein. An entire FACCH message, in some embodiments, may be interleaved across two frames, as per IS-54. 49 bits are associated with the FACCH, one from a continuation flag and 48 from the FACCH message. In the present invention, the FACCH message is appended to the end of speech bursts and is used for:

(1) Mobile Assisted Hand Off Poll (forward channel), which is referred to as MAHOPoll;
(2) Time Set Command (forward channel), which is referred to as TimeSetCmd;
(3) Mobile Assisted Hand Off Report (reverse channel), which is referred to as MAHOReport;
(4) Power Set Command (forward channel), which is referred to as PwrSetCmd;
(5) DSI pool entrance (forward channel);
(6) DSI pool acknowledge (reverse channel), which is referred to as DSI Pool Ack;
(7) Hand off Command (forward channel), which is referred to as HandoffCmd.

In the forward direction, the control slots will be referred to as a Forward Control Slot (FC). The other slots in the forward direction are considered Forward Traffic Channels (FT). However for some purposes the FT will handle Forward Traffic FACCH (FT-FACCH).

As has been mentioned, the E-TDMA system preferably requires control channels to dynamically assign traffic channels to active users. The FC carries assignment and acknowledgment messages, while the RC carries reverse requests and reverse acknowledgments.

Figure 10:
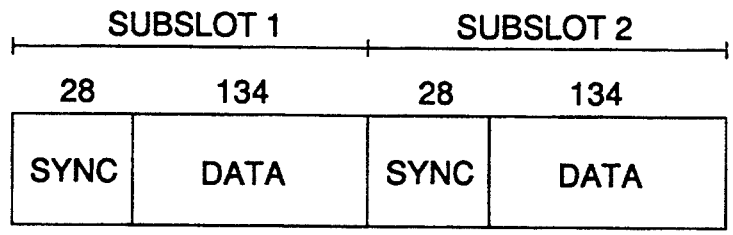
FIG. 10 illustrates a forward control channel slot comprising sub-slots 1 and 2 according to the present invention.

As shown in FIG. 10, according to the present invention, the FC channel or slot is divided into two sub-slots, wherein each sub-slot comprises a SYNC field and a data field. Each data field of each sub-slot carries two messages, messages A and B. The messages may be destined for the same or different mobiles. While there are two messages in each data field, the color code and error control bits are shared, as shown in the following table.

| Forward Control Sub-Slot Data Field | | |
|---|---|---|
| TYPE | A | B |
| Message Type | 5 | 5 |
| Spurt Number | 1 | 1 |
| Division Group | 1 | 1 |
| Frame Indicator | 1 | 1 |
| RR Sub-Slot | 4 | 4 |
| Assign | 8 | 8 |
| Mobile ID | 8 | 8 |
| Color | 8 | |
| CRC | 16 | |
| 0 Padding | 5 | |
| Spare | 3 | |
| Total | 88 + 1 | |
| FEC × 3/2 | 134 | |
| SYNC | 28 | |
| Total | 162 bits | |

The 88+1 representation of the data is given to show that the rate ⅔ coder will put out half an FEC symbol for the last symbol time.

The mobile ID is an 8-bit identifier for the mobile which is assigned when it enters the DSI pool. The assign field indicates the slot and channel being assigned. The RR sub-slot field is a 4-bit indication of the RR sub-slot to be used by the mobile to acknowledge this message if the message requires an acknowledgment. The message type is a 5-bit designation of the type of message being sent. The message types are:
(1) reverse allocation acknowledgment, referred to as RevAllocAck;
(2) reverse assignment, referred to RevAsgn;
(3) reverse de-allocation acknowledgment, referred to as RevDeallocAck;
(4) forward assignment, referred to as FwdAsgn;
(5) forward de-allocation request, referred to as FwdDeallocReq;
(6) power set command, referred to as PwrSetCmd;
(7) time set command, referred to as TimeSetCmd;
(8) measurement order message, referred to as MeasurementOrderMsg;
(9) stop measurement order, referred to as StopMeasurementOrder;
(10) status poll, referred to as StatusPoll;
(11) MAHOPoll;
(12) DSI disable, referred to as DSIDisable
(13) DSI enable, referred to as DSIEnable;
(14) Audit;
(15) Release;
(16) Release Ack;
(17) Connect Ack;
(18) Maintenance
(19) Status;
(20) Burst DTMF (Dual Tone Multiple Frequency) Ack; and
(21) Continuous DTMF Ack.

Normally, the base response to a RevAllocReq is a RevAsgn. Only if the base cannot provide a RevAsgn is the RevAllocAck sent.

The spurt number is a 1-bit number indicating the sequence number of the message. Diversity group is a 1-bit counter which changes value for each new diversity group. The frame indicator is used to resolve frame ambiguity in assignment messages.

Figure 12:
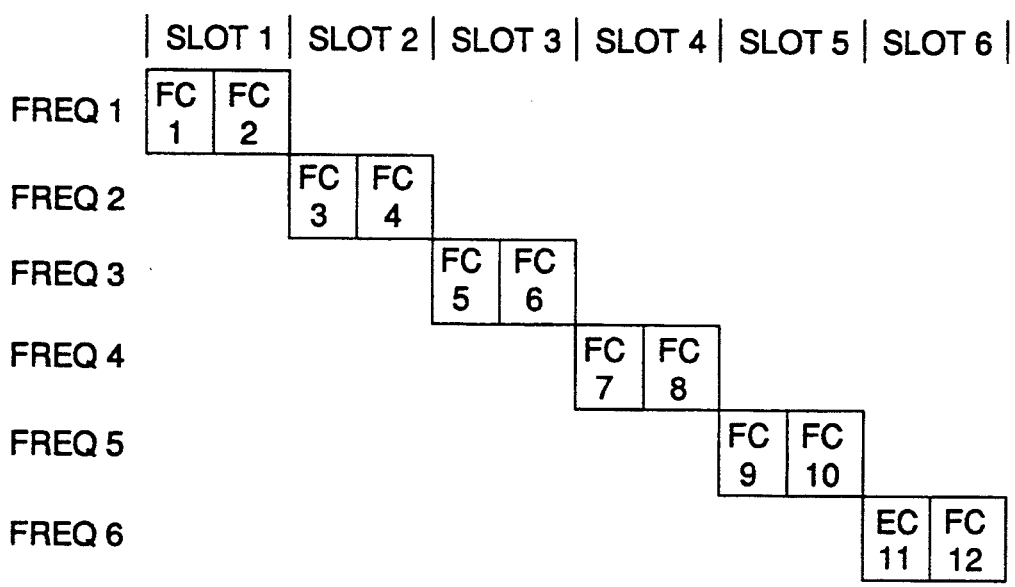
FIG. 12 illustrates the frequency hopping scheme for forward control channels according to the present invention.

The FC channel is frequency hopped, as shown in FIG. 12. In other words, within a single frame time, there are six slots which are used for the forward control channel, each slot carrying two sub-slots, and therefore within a frame time there are sub-slots FC1–FC12. Each of these forward control subslots are time displaced from one another, i.e., none of the FC1–FC12 occur simultaneously. Furthermore, within the given frame time, six different carrier frequencies are used to carry FC1–FC12.

Figure 11:
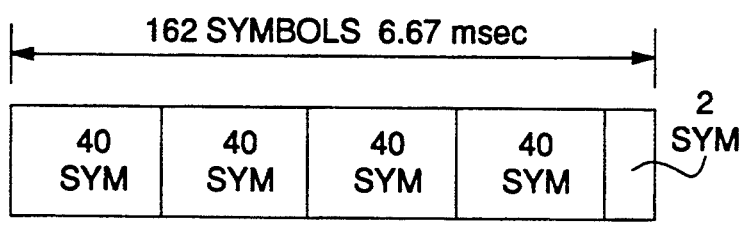
FIG. 11 illustrates a reverse control channel slot comprising four sub-slots according to the present invention.

The reverse control channel carries reverse requests and acknowledgments, i.e., from the mobile to the base station. The channel is frequency hopped, as will be described. In each slot (such as the slot shown in FIG. 11), there are four sub-slots. Three of the subslots are referred to as Reverse ALOHA (RA) because this channel uses a contention protocol for access. One of the four sub-slots is referred to as a Reverse Response (RR) sub-slot; the RR sub-slots do not use contention. The format of each of these sub-slots is shown in FIG. 14. Note that the duration of each portion of the sub-slot is shown in FIG. 14 as a function of bit length and that each of the sub-slots shown in FIG. 11 encompasses 40 symbols or 80 bits. The 40 bits of data are broken down into the following data fields for RA:
Mobile ID: 8 bits
Message type: 2 bits
Speech spurt: 1 bit
Diversity group: 1 bit
DVCC: 8 bits
CRC and FEC: 20 bits
Total: 40 bits The reverse response (RR) sub-slot data fields also total 40 bits and are as follows:
Mobile ID: 8 bits
Message type: 4 bits DVCC: 8 bits
CRC and FEC: 20 bits
Total 40 bits FIG. 15 shows a preferred arrangement for placement of the six reverse control slots in a single frame time. As indicated, each slot includes three RA sub-slots and one RR sub-slot, so that over the frame time there are six RR slots and 18 RA slots, although all the RR and RA slots are transmitted at different times, and slots RR1–RR6 are distributed over the six different carrier frequencies and slots RA1–RA18 are distributed over six different carrier frequencies.

Figure 16:
FIGS. 16 and 17 are variations on the frequency hopping and complement of reverse control sub-slots such as that of FIG. 14.
Figure 17:
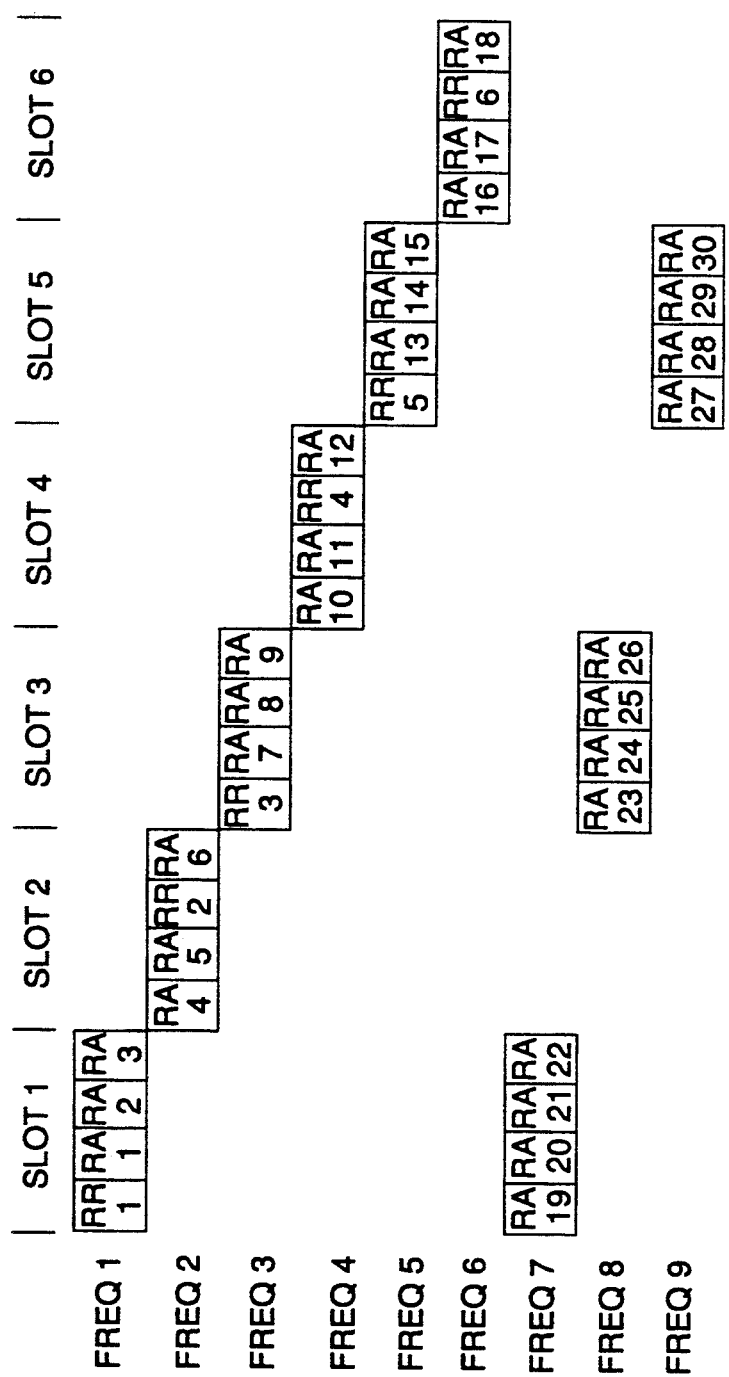

In the event more than 24 sub-slots per frame time are required, the arrangement of FIG. 15 .can be altered to include 7 or 9 control slots per frame time, using 7 or 9 frequencies, as shown in FIGS. 16 and 17, respectively.

The message type in the RA sub-slot designates one of the following four message types:
(1) Reverse allocate request,
(2) Reverse de-allocate request,
(3) Connect,
(4) Release.

The primary use of the RA sub-slot is the reverse allocate request message. The reverse de-allocate request is used for back up only in the event that the de-allocation message (which is part of the reverse traffic channel) is not acknowledged by the cell site. Connect and Release are call processing steps and, preferably do not imply that any traffic channels are dedicated (on Connect) or freed (on Release). The four message type bits in the RR sub-slot indicate a message as one of the following:
(1) Hand off acknowledge,
(2) Power set acknowledge,
(3) Time set acknowledge,
(4) Mobile assisted hand off acknowledge,
(5) Mobile assisted hand off start acknowledge,
(6) Status acknowledge,
(7) Forward assignment acknowledge,
(8) Reverse assignment acknowledge,
(9) Forward de-allocate acknowledge,
(10) Connect acknowledge,
(11) Release acknowledge,
(12) Call processor status acknowledge,
(13) Audit acknowledge,
(14) Call processor maintenance acknowledge.

Having described the formats of the various traffic and control channels and their interrelationship, the manner in which the mobile and base station cooperate in order to perform the various functions necessary to communications are now described.

In the initial phase of a call, the mobile identifies itself to the BSC. That identification includes, if appropriate, E-TDMA system capability. When identified, such an E-TDMA system capable mobile may be directed to a DSI pool. Typically, the initial messaging is on the analog control channel directing the mobile to a particular frequency and slot.

The mobile will then send a shortened burst (as described below) for power and timing adjustment. The mobile will then receive an indication that it is in a DSI pool and be given a forward traffic assignment. A message will be sent on the FACCH listing all of the frequencies comprising the DSI pool and the location of all of the control channels. The mobile will acknowledge the message on the reverse FACCH. The information provided includes the mobile ID, which is an 8-bit identifier for the mobile, while it is part of the DSI pool.

The pool size is a 5-bit value indicating the number of RF channels in the DSI pool. A channel list is provided to the mobile, which is the channel number for each RF channel in the pool. The channel list has a 10-bit number for each channel in the pool. The mobile subsequently refers to RF channels in the pool by an abbreviated number. The order in which the channels are listed allows the mobile to derive an index to the list which represents the abbreviated channel number. The mobile is also informed of the number of control slots in the pool and the abbreviated frequency identification for each of the control slots. With this information, the mobile can determine the location of the control slots and derive an abbreviated pool description in which a slot or channel is designated by an 8-bit number. The mobile can also determine whether it will receive forward control in the first or the second sub-slot by whether its mobile ID is odd or even. The use of the mobile ID (the 8-bit identifier) and the abbreviated slot/channel designation (8 bits) allow the information necessary for transmission in the control slots to be fit within the different sub-slot formats. For example, by using this abbreviated identification information, each forward control slot can be subdivided into two and two messages can be packed within each subslot. In the example described herein, where there are only 6 forward control slots per frame, each with two subslots, the mobiles select the subslot based on their ID on a modulo 2 basis, i.e. there are corresponding "odd" and "even" subslots and mobiles. With more than 6 forward control slots per frame, there is at least a pair of time coincident forward control slots. Therefore the mobile slot and subslot selection may be on a modulo 4 basis, i.e., mobile Ids ending in 1, 5 and 9 form group OA, those with IDs ending in 3 and 7 form group OB, those with IDs ending in 0, 4 and 8 form group EA and those with IDs ending in 2 and 6 form group EB. Groups OA and EA use odd and even subslots, respectively in the first six forward control slots (on carrier frequencies 1–6, see FIG. 4) as already described. Groups OB and EB take odd and even subslots, respectively in forward control slots 7–x (where x may be in the range 8–12). Of course this same procedure may also be extended if necessary.

Figure 18:
FIG. 18 illustrates a shortened burst for power and timing adjustment under IS-54.

The shortened burst which is used for power and timing adjustments is shown in FIG. 18 and is defined in IS-54. As shown in the figure:
G1 is a 3-symbol length guard time,
R is a 3-symbol length ramp time,
S is a 14-symbol length sync word (the mobile station uses its assigned sync word),
D is a 6-symbol length CDVCC, and
G2 is a 22-symbol length guard time The fields V, W, X and Y all contain zero bits where the V field contains 4 bits, the W field contains 8, the X field contains 12 and the Y field contains 16.

The length of the initial message sent to the mobile on the FACCH which lists the frequencies comprising the DSI pool and the location of the control channels depends, of course on the size of the DSI pool. The message is partitioned into 48 bit segments where the message segments have room for a continuation flag. Each message segment will be individually acknowledged. The messages from base to mobile are sent on the FT-FACCH, whereas the acknowledgments are sent on the RT-FACCH.

The messages required to support DSI channel allocation and de-allocation include reverse allocation, reverse deallocation, forward allocation and forward de-allocation. In each of these message exchanges, some form of time and frequency diversity is used to assure highly reliable channel operation without excessive delay.

Reverse Allocation

According to the present invention, when the mobile detects speech, it sends the RevAllocReq message on the RA channel to the BSC. To mitigate the effects of Rayleigh fading and collisions on the RA channel (since it is a contention channel), the mobile actually sends the message K times by randomly choosing an appropriate set of sub-slots (in this example K=3). In one case, the mobile randomly selects one sub-slot of the first three available sub-slots. Performance management (trading off delay vs. probability of success) may suggest other selections, such as random selection of sub-slots in the succeeding three pairs of available slots. The availability of a slot is affected by whether the mobile must listen to forward speech on one of the forward slots and thus cannot transmit on some reverse slots. In response to detection of the mobile's reverse allocate request message, the BSC sends either a reverse allocation acknowledgment or a reverse assignment to the mobile. The acknowledgment is sent only if a channel cannot be immediately assigned. In the event the mobile receives an acknowledgment, it simply waits with no further action. Assuming, however, that the mobile receives a reverse assignment, it tunes to the appropriate traffic frequency and slot in the reverse direction. A transcoder, at the base station, is also notified of the assignment.

Figure 19:
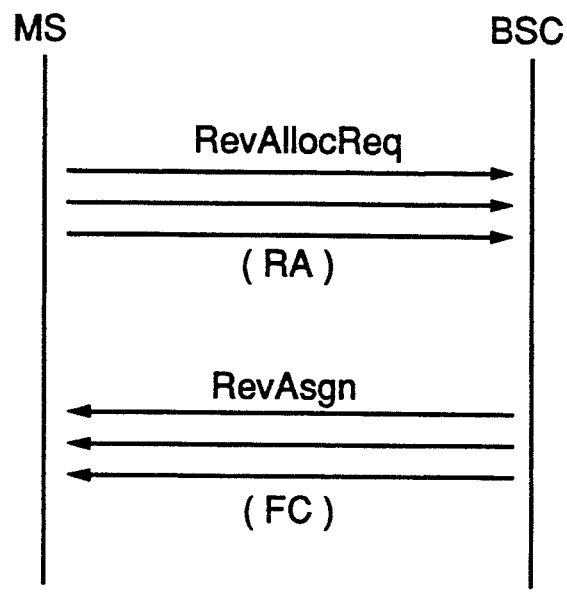
FIG. 19 illustrates a reverse allocation request and reverse assignment exchange.

This message exchange is illustrated in FIG. 19 where the time axis extends vertically downward. The mobile is identified by MS, the base station is identified as BSC. As shown in FIG. 19, the reverse allocation request message is sent on a RA channel using triple diversity for example. In addition to diversity in time and frequency, as will be explained below, the power level is also varied so as to provide for diversity protection in power, time and frequency. When the BSC responds to the allocation request and can assign channels, it transmits the reverse assignment on the FC. As indicated in FIG. 19, this assignment message is also diversity protected, however, in this direction the protection is preferably only in time and frequency. The contents of the reverse assignment message include the carrier frequency and slot assignment for the particular speech spurt. If the mobile does not receive either reverse assignment or reverse allocation acknowledgment, it repeats the reverse allocation request after a suitable time out.

Figure 20:
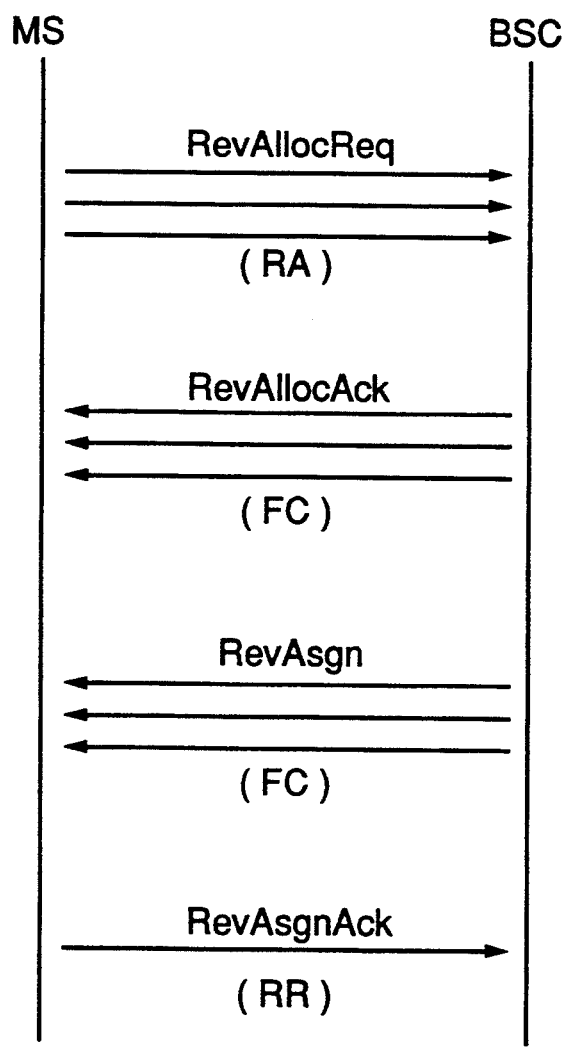
FIG. 20 illustrates a different reverse allocation request/reverse allocation acknowledgment/reverse assignment/reverse assignment acknowledgment exchange.

FIG. 20 shows a situation wherein the BSC, on receipt of the allocation request, initially cannot allocate a channel, and therefore sends the reverse allocation acknowledgment. Receipt of the reverse allocation acknowledgment preempts a repeat of the mobile's reverse allocation request. When the BSC can assign a channel, it does so as shown in FIG. 20. FIG. 20 also shows the reverse assignment acknowledge message on the RR channel. The reverse assignment acknowledgment shown in FIG. 20 is also a message that is implemented in the scenario shown in FIG. 19, but that acknowledgment message is omitted from FIG. 19.

Figure 21:
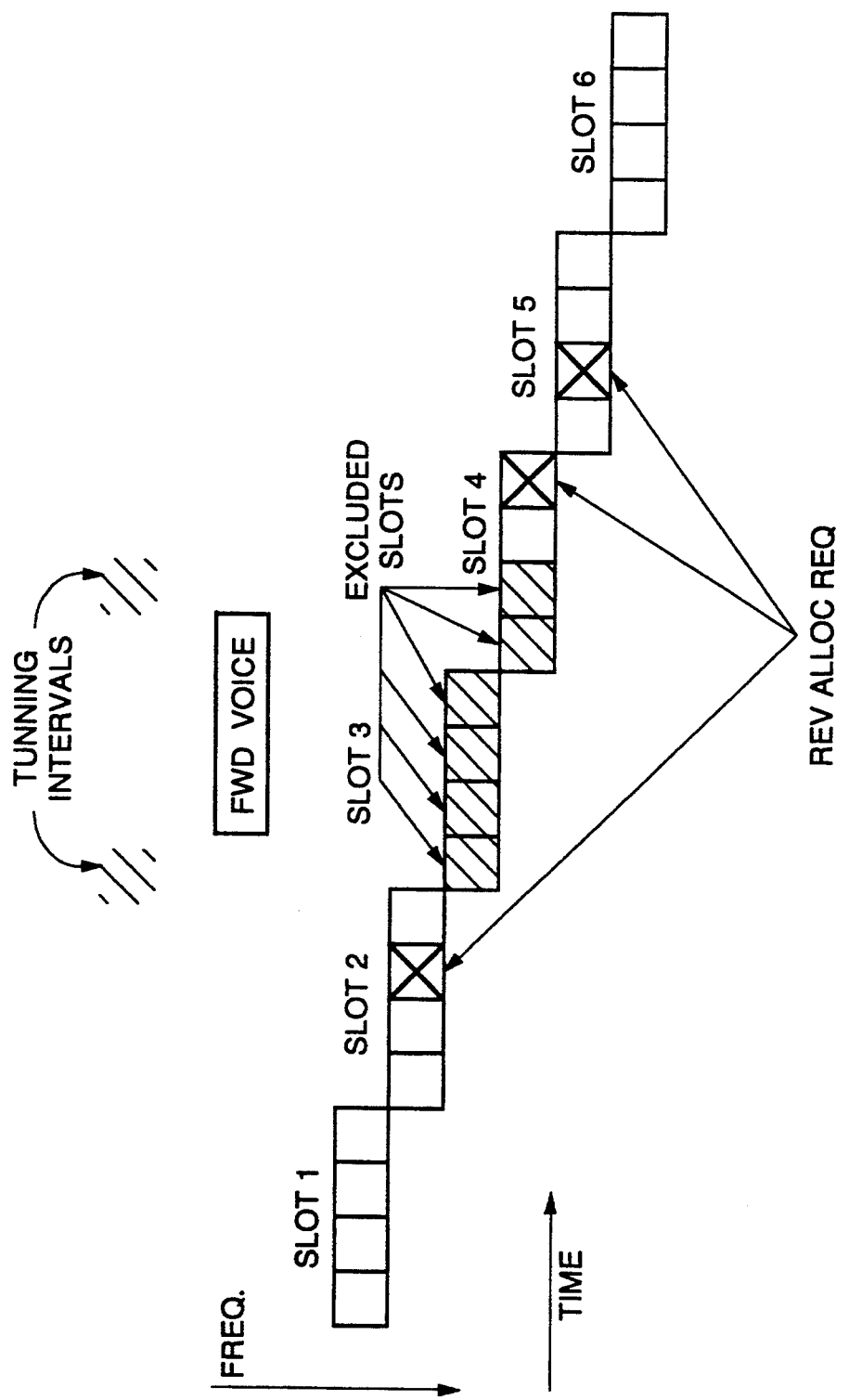
FIG. 21 illustrates how certain reverse slots are excluded if the mobile has a forward assignment.

In the case of double talk, i.e., the mobile is receiving forward voice when the reverse speech detection process detects the presence of reverse speech, the mobile may not be able to use certain of the RA sub-slots since it is required to tune and listen to forward speech. This example is illustrated in FIG. 21, where frequency varies on the vertical axis and time proceeds left to right. FIG. 21 illustrates that a reverse allocation request message is sent in a sub-slot of slot 2 of a particular frame. Because the mobile is required to first tune to a forward voice channel, listen to the voice channel and then retune to the reverse control channels, all sub-slots of slot 3 and several of the sub-slots of slot 4 are excluded from use for transmission of the reverse allocation request message. Accordingly, the mobile must delay sending other copies of the reverse allocation request message until the randomly selected sub-slots of slots 4 and 5 as shown in FIG. 21.

Figure 22:
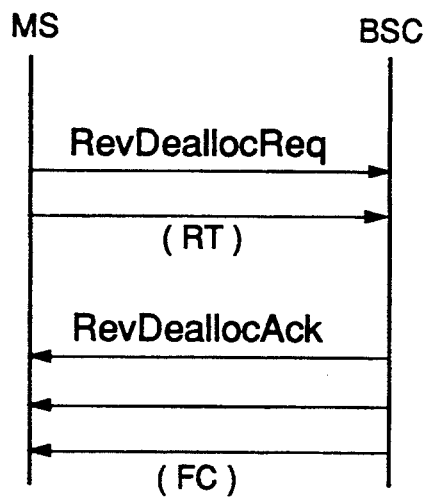
FIG. 22 illustrates a reverse de-allocation request and reverse de-allocation acknowledgment.

When the mobile speech detector determines that the speech spurt has terminated, the mobile formulates and transmits a reverse de-allocation request to the BSC. This request is sent over the last two frames of speech, and is carried in the traffic channel. Inasmuch as, as will be described below, the base station also includes a speech detector, the base station can respond to either or both of detection of the reverse deal location request and/or the termination of the speech spurt. The possibility of a transmission error producing an incorrect reverse deallocation request suggests that the reverse deallocation process at the base station not take place until the base detects speech spurt termination. A step in the reverse deallocation is the transmission of a reverse deallocation acknowledgment to the mobile. This process is shown in FIG. 22. Of course the reverse deallocation acknowledgment is sent on a FC as illustrated.

Figure 23:
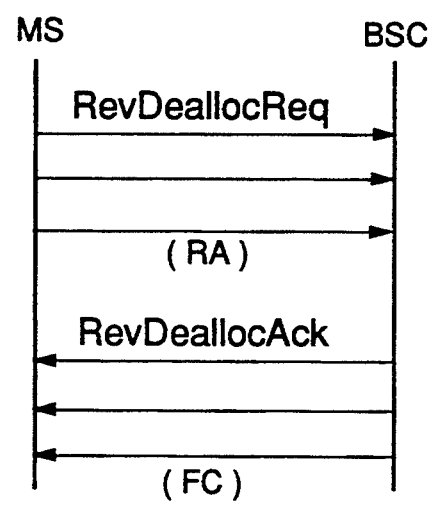
FIG. 23 illustrates a different reverse de-allocation request and acknowledgment exchange.

In the event the mobile does not receive the reverse deallocation acknowledgment, it will repeat the transmission of the reverse deallocation request on the RA channel. This is, of course, undesirable, because it places additional, and perhaps unnecessary, load on the RA channel. To avoid this, the reverse deallocation acknowledgment is sent with diversity, as shown in FIG. 22. The reverse deallocation acknowledgment can also be sent in response to the reverse deallocation request sent on the RA channel, as described. This scenario is shown in FIG. 23.

Finally, a reverse deallocation can occur without explicit messaging, when a reverse allocation for a new speech spud arrives at the BSC. The old and new speech spurt are distinguished by the speech spud identifier in the reverse allocation request.

Forward Allocation

Figure 24:
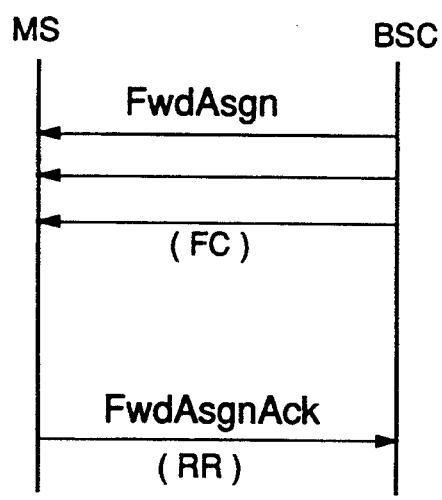
FIG. 24 illustrates a forward assignment and forward assignment acknowledgment exchange.

According to the present invention, when the transcoder (TC) at the base station detects speech, it sends a forward allocation request (FwdAllocReq) to the BSC. The BSC, in return, sends a forward assignment (FwdAsgn) to both the mobile and the transcoder (TC). The mobile responds with the forward assignment acknowledge (FwdAsgnAck) to the BSC and tunes to the appropriate traffic slot in the forward direction. The base station sends the forward assignment to the mobile on the forward control channel with diversity (as shown in FIG. 24). The mobile tunes to the commanded frequency and slot but will revert to listening to the forward control subslots at times outside the assigned traffic channel. The mobile will respond to the forward assignment with an acknowledgment (RR). If the base station does not receive the acknowledgment, it repeats the forward assignment. Failure to receive the acknowledgment can occur if the acknowledgment becomes lost or the assignment is lost. Losing the acknowledgment is a relatively minor problem since no clipping occurs. For this reason, the acknowledgment is not sent on a diversity channel. If the assignment is lost, clipping can occur, so the assignment is transmitted with diversity.

Figure 25:
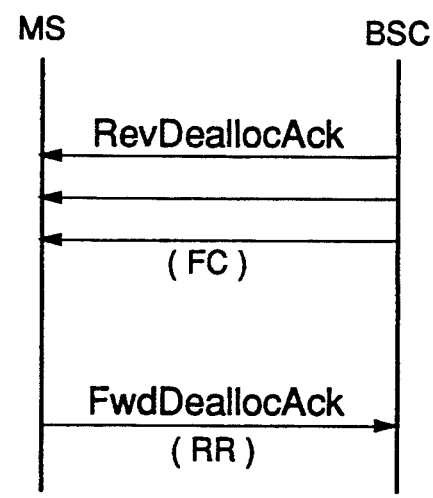
FIG. 25 illustrates a forward de-allocation request and forward de-allocation acknowledgment exchange.

When the transcoder (at the base station) determines that the speech spud is terminated, it sends a forward deallocation request to the BSC. BSC forwards this message to the mobile on an FC, with diversity, see FIG. 25. When received, the mobile sends a forward deallocation acknowledgment (RR). BSC, on receipt of the forward deallocation acknowledgment, forwards this to the transcoder (TC).

Power Control Messages

Figure 26:
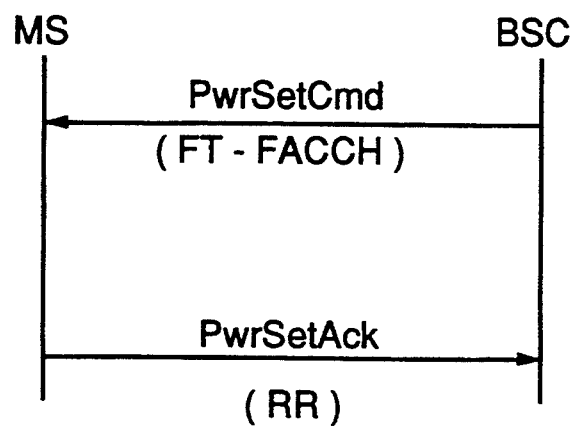
FIG. 26 illustrates a power set command and power set acknowledgment exchange.
Figure 27:
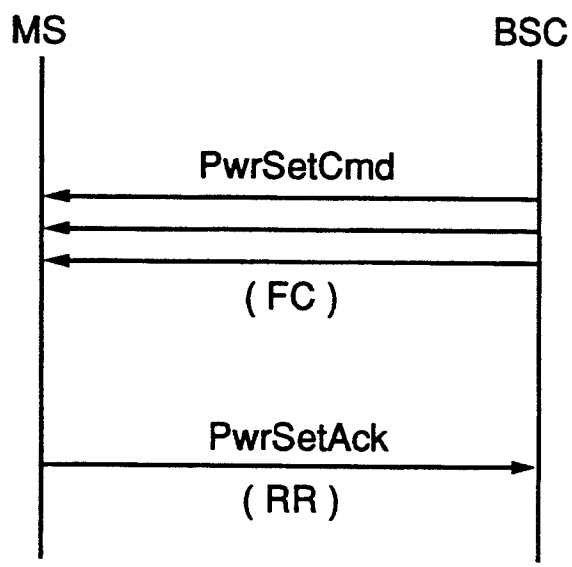
FIG. 27 illustrates a different power set command and power set acknowledgment exchange.

In existing cellular systems, power is set only when a mobile begins a call or enters a cell. A comparable function can be performed in accordance with the present invention as disclosed herein. For analog systems where power is actually controlled, the cell site continually monitors mobile power and adjusts it roughly every half second. Since speech pauses tend to be longer than a half second, the E-TDMA system may not be able to rely on cell site power monitoring for power control. Under normal circumstances, FACCH can be used to update mobile power setting during forward speech spurts. At other times, the mobile can perform open loop power control based on the measured power of the received forward control channels. Since the main purpose for power control is to correct for shadowing, the forward and reverse channels should be well-correlated so that the measurements on the forward channel are applicable to the reverse channel. During very long speech spurt gaps, the BSC can use a FC to command the mobile to a specific power level. To provide the cell site with a burst over which to calibrate the mobile's power, the base sends the mobile a message on a FC requesting a burst with which to calibrate the mobile's power level, in the event the speech gap is relatively long (say 3 seconds). The FC command from the base specifies not only the channel (frequency and slot) but also the duration of the burst, say 4 frames. This is similar to the idle channel noise measurement case which is described below. Typically, the power set command (on FT-FACCH) from base to mobile is acknowledged on the RR channel. In the event of a long speech gap, the power set command can be sent on the FC, with diversity. These two procedures are shown in FIGS. 26 and 27.

Hand Off Control

Figure 28:
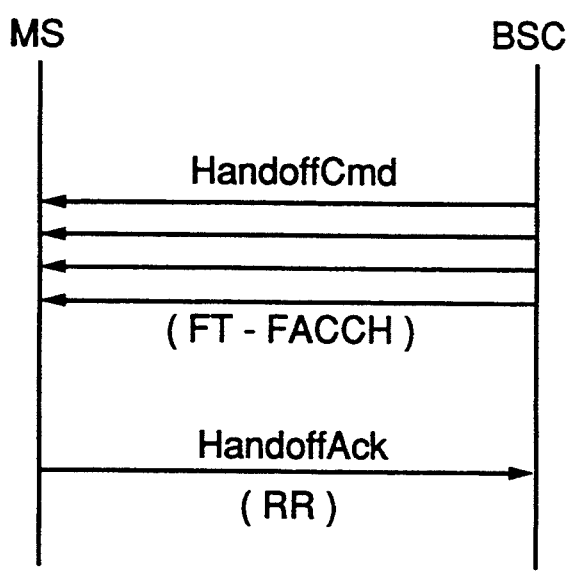
FIG. 28 illustrates a handoff command and handoff acknowledgment exchange.

Hand off control messages for mobiles according to the present invention are carried on a control channel. Basically, the mobile will be commanded to a full duplex half rate channel on which it can send shortened bursts and receive the DSI parameters of the new cell pool. This procedure is analogous to the call start or DSI pool entrance which is described above. The forward messages are sent on the FT-FACCH, as illustrated in FIG. 28. If the acknowledgment is not received, the hand off command can be repeated. Since the DSI pool entrance message is relatively long and, in the case of hand off, is sent under the worst channel conditions, it is advisable to send this message with heavy diversity, for example, repeated at least four times, and require that each component of the message is acknowledged on the RR channel.

Timing Control Messages

Figure 29:
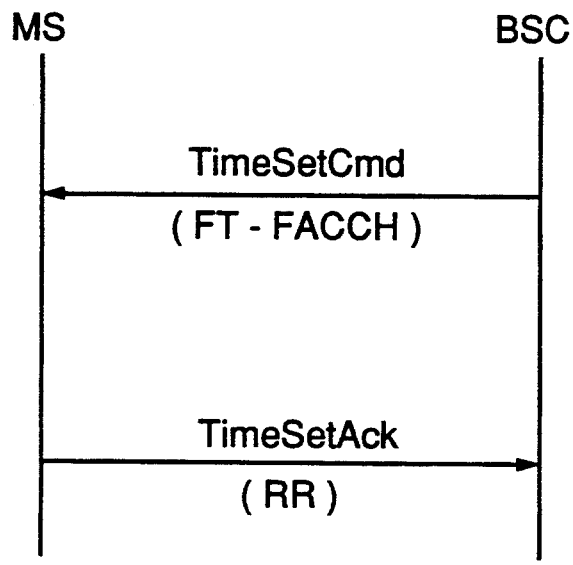
FIG. 29 illustrates a time set command and time set acknowledgment exchange.
Figure 30:
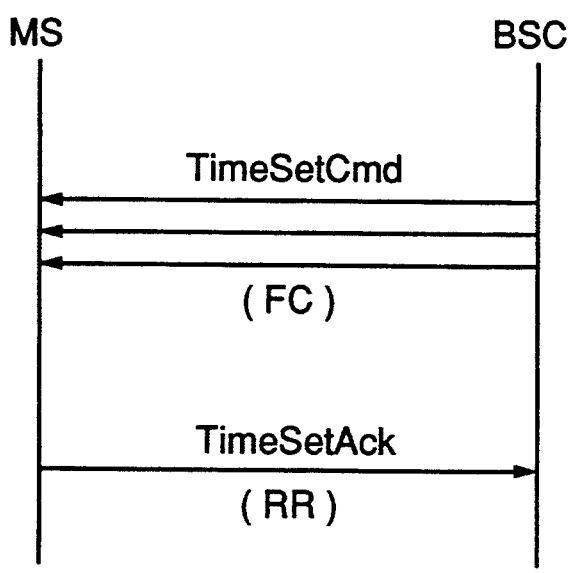
FIG. 30 illustrates a different time set command and time set acknowledgment exchange.

A timing set command is used to adjust the mobile's transmit timing. FIGS. 29 and 30 show a message exchange for setting timing under two different circumstances. In the case of FIG. 29, the time set command is sent over the FT-FACCH, in the presence of forward traffic to the mobile. FIG. 30 is applicable in the event there is no forward traffic to the mobile so that the command is sent over the FC.

In addition to timing messages, the base station may send an idle poll to identify the presence of mobiles which have not communicated with the base station within some specified time window. The status poll then is transmitted on the FC and the acknowledgment is returned on the RR.

Idle Noise

Typically, both the transcoder at the base station and the mobile insert idle channel noise. The base station idle channel noise is, of course, directed toward the PSTN, whereas the mobile added idle channel noise is directed at the mobile user. Both the base station and the mobile can use a signal level at the end of a speech spurt packet to adjust the level of idle channel noise. Idle channel noise serves the purpose of preventing the listener from believing the previously established connection has somehow been broken. For the case of the listener connected at the PSTN end, the special circumstances of being connected to a mobile telephone call may require some additional consideration. More particularly, whereas the ambient noise or idle channel noise appropriate to the PSTN end of the conversation may be relatively constant, the ambient noise level at the mobile may be significantly more variable. If, for example, the ambient noise level at the mobile was, at the end of a particular speech spurt, at a relatively low level, then the base station would be adding low level idle channel noise in the forward direction. If, thereafter, just before the next speech spurt, the ambient noise level is significantly increased, then the listener at the PSTN end will hear a discontinuity in the ambient noise level which could be disturbing. To overcome this problem, especially where the gap between speech spurts is relatively long (say 3 seconds or more), the base station can initiate a procedure to actually measure ambient noise level. More particularly, the base will send (on FC) a reverse channel assignment to the mobile for a predetermined duration, e.g. four frames. The mobile then transmits (even in the absence of speech) a signal registering ambient noise level over the assigned four frames. The base station can then use this information to adjust its idle channel noise level. This procedure avoids overloading the RA channels inasmuch as the procedure does not use the RA channel.

FIGS. 31–36 illustrate exemplary timing for respectively the reverse allocation process, the reverse voice path, forward allocation, forward voice path, forward deallocate/reallocate and reverse deallocate/reallocate.

Figure 31:
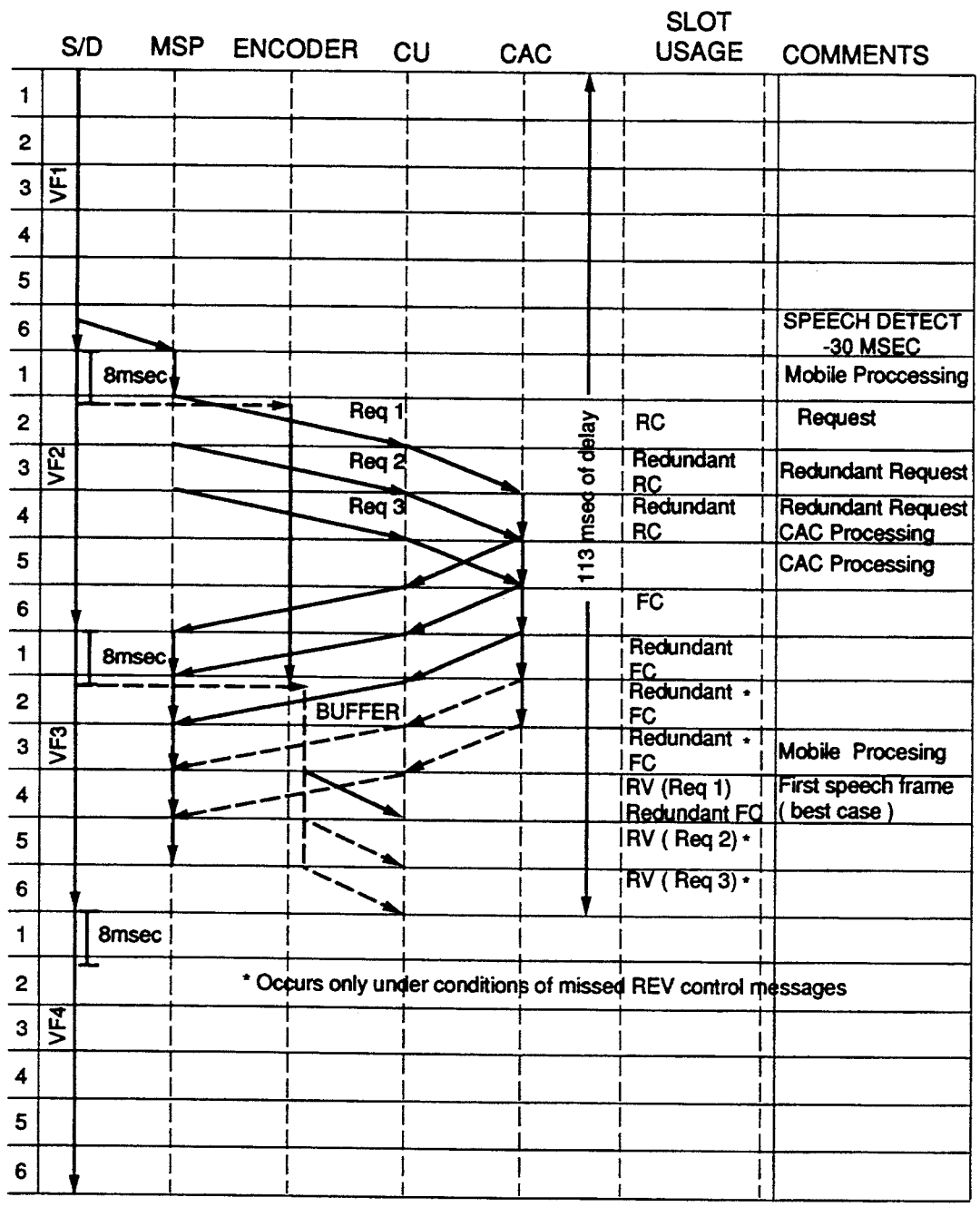
FIG. 31 illustrates the timing on a reverse channel allocation request, assignment and transmission.
Figure 32:
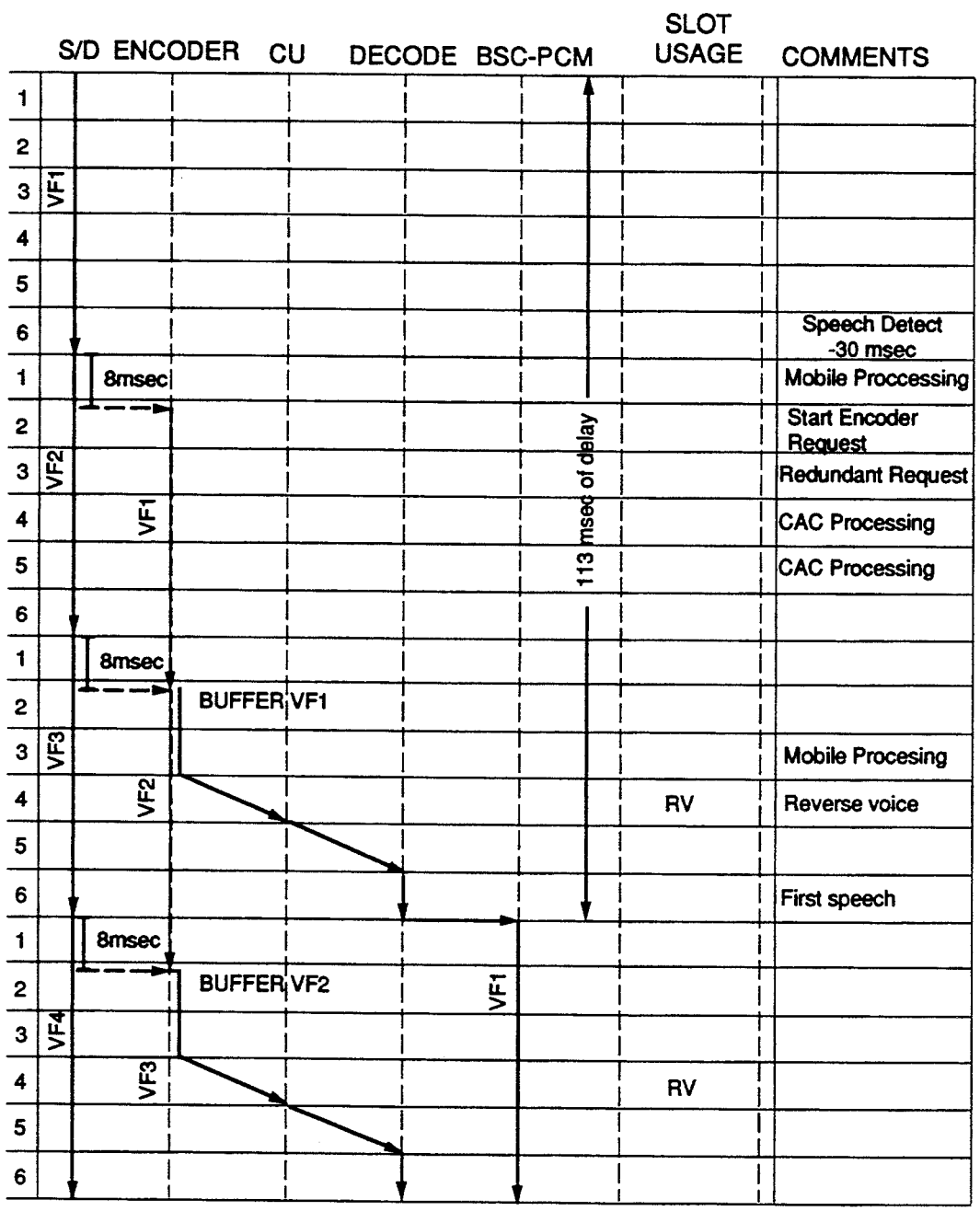
FIG. 32 illustrates reverse channel delay in the voice path.

In these figures, time proceeds vertically downward and different components in the system are identified along the horizontal axis. In FIGS. 31 and 32, since they are related to reverse channel operations, S/D refers to the speech detector in the mobile, MSP refers to the mobile's signal processor and the designation encoder refers to the speech encoder at the mobile. On the other hand, the reference CU refers to the channel unit at the base, and CAC refers to the channel access control (also referred to as CAP hereinafter) at the BSC.

As is typical in TDMA operations, time compression is an important feature of the processing. More particularly, with a 40 ms frame and a 6.67 ms slot time, up to 40 ms of speech is compressed and transmitted in a 6.67 ms slot. FIG. 31 shows that the speech detector S/D has identified the presence of speech at some point within slot 6 of the frame identified as VF1. This results in a signal to the MSP which launches a trio of reverse request messages, identified as Req1, Req2 and Req3, in time sequence. As shown in FIG. 31, these are received at the base station (CU) at the end of slots 2, 3 and 4 in frame VF2 and the requests are recognized in the BSC at the end of slots 3, 4 and 5 respectively. Those skilled in the art should understand that since Req1, Req2 and Req3 can occupy any RA sub-slot, the precise time at which these transmissions are made, and received, is not shown in FIG. 31. The illustration uses the end of the slot time as a convenient (but inexact) representation. These requests then result in the transmission of a reverse assignment message, actually three messages, which are sent at the ends of slots 5 and 6 in the frame VF2 and slot 1 in the frame VF3. Just like the case of Req1, etc., the forward assignments are contained in one of two sub-slots, so the representation in FIG. 31 is convenient but inexact. The assignments are received at the mobile MSP at the end of slot 6 in the frame VF2 and at the end of slots 1 and 2 in the frames VF3. This, in turn, results in the transmission of speech with the initiation of slot 4 in the frame VF3, and that transmission will be received at the base station at the end of slot 4 in the frame VF3. If for some reason the first assignment is not received at the base, then the first speech transmission may be delayed by a slot time or two as shown in FIG. 31.

The encoding process requires not only the 40 ms of speech which are to be encoded, but also an additional 8 ms of "future" speech. That is the reason for the 8 ms notation in FIG. 31, i.e., the encoding process, although based on voice from frame VF1, does not begin until some time within slot 2 of frame VF2.

In summary then, detection of speech near the end of VF1 results in speech occurring during VF1 being encoded, buffered and available at the base station at the end of slot 4 of VF3. After decoding, that speech is available at the base in PCM form at the end of slot 6 for an approximately 113 ms delay.

Figure 34:
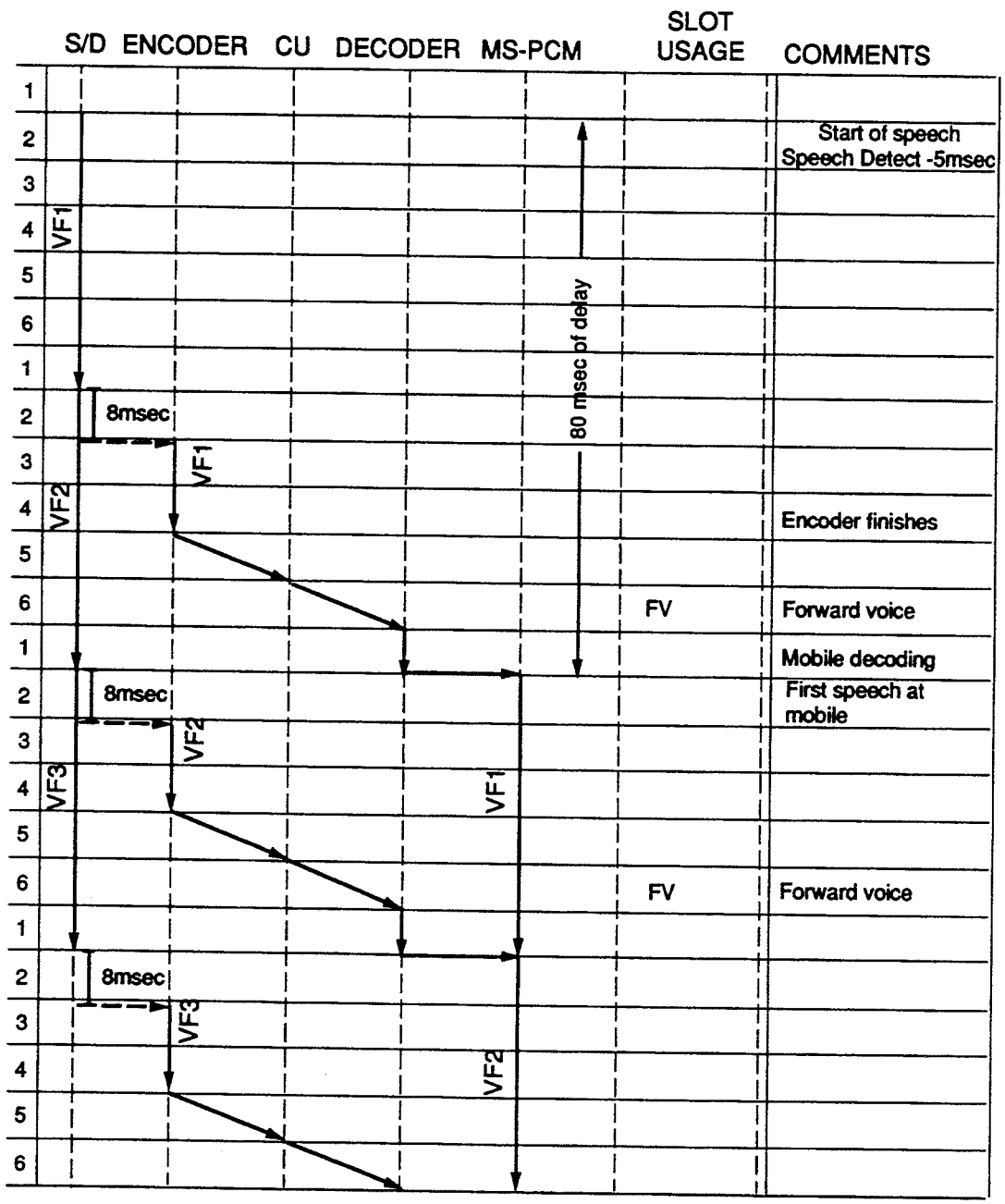
FIG. 34 illustrates the delay in the forward traffic direction.

FIGS. 33 and 34 are similar timing diagrams for the forward operation. In FIGS. 33 and 34, the S/D referred to is the speech detector at the base station (part of the transcoder), the CAC is the channel access control at the base station, the encoder is at the base station, the CU referred to is at the base station whereas the MSP is the mobile speech processor, i.e. at the mobile. As shown in FIG. 33 then, the detection of speech at the end of slot 2 of a given frame results in the transmission of a forward assignment from the base station at the end of slot 5 of the same frame, and receipt of that message at the end of slot 6 at the first frame. The redundant messages are received at the mobile at the end of slots 1 and 2 of the next frame. The first speech is transmitted from the base station at the end of slot 5 of the second frame (where speech was detected in the first) and received at the mobile at the end of slot 6 of that second frame. As shown in FIG. 34, the delay for the forward channel is 80 ms.

FIG. 35 shows a forward deallocation with respect to one mobile and a forward reallocation with respect to a different mobile. As shown in FIG. 35, the speech spurt extending through slot 2 of a given frame results in the last transmission for that spurt (thus including a deallocate message being transmitted from the base station at the end of slot 6 of the same frame). FIG. 35 shows that the CAC has allocated that same slot at the end of slot 5 so that the base station channel unit transmits both the forward deallocation and forward allocation simultaneously (of course, to different mobiles).

FIG. 36 is similar to FIG. 35 except for the case of the reverse deallocate and allocate. More particularly, the notation VFlast indicates that speech spurt terminates at the end of slot 2, which results in VFlast being received at the base station at the end of slot 6 of the same frame. FIG. 36 also shows that the mobile detects speech somewhere within slot 2 of a frame called VF1. This results in a reverse request which is received at the base station at the end of slot 4 (of VF2). Thus, within slot 6 (of VF2) the CAC processes the deallocate request and thereafter assigns the now-available channel to the newly requesting mobile. Finally, FIG. 36 shows that the first speech from the new mobile is available at the base station (CU) at the end of slot 6 of the frame identified as VF3. It should be apparent that the timing of FIGS. 31-36 are exemplary and changes to these illustrations can be made within the scope of the invention.

The Equipment

Figure 38:
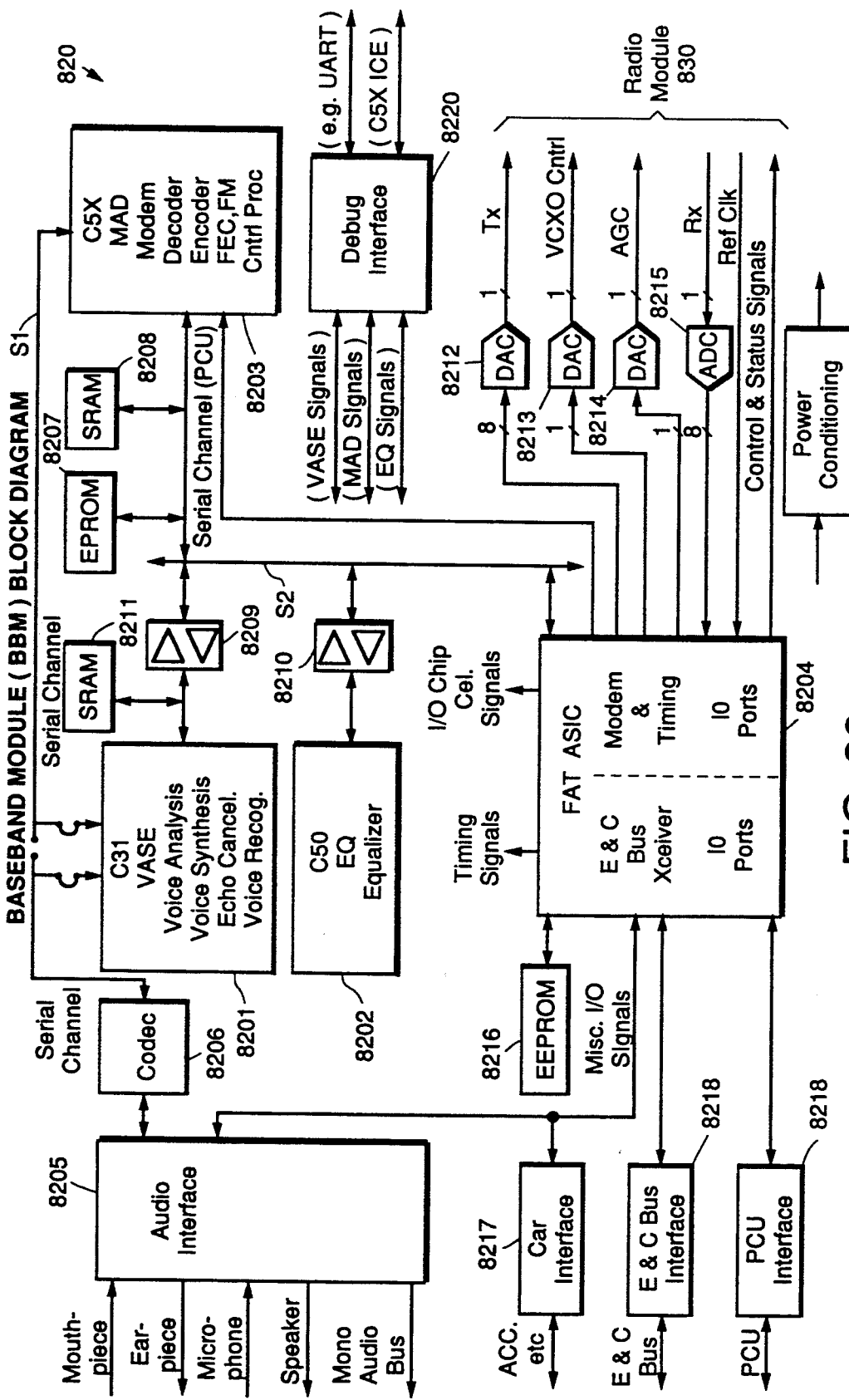
FIG. 38 is a detailed block diagram of the baseband module 820 of FIG. 13.

FIG. 37 is a block diagram of the equipment used in the network subsystem and base subsystem components of the apparatus. FIG. 13 is a block diagram of the mobile subsystem and FIG. 38 is a block diagram of base band module 820. As seen in FIG. 37 each cell, such as the illustrative cells A, B, C and D, includes a base transceiver station BTS. The BTS includes RF equipment, i.e. transmitters, receivers and antennas, as well as filtering, amplification and signal distribution to one or more Channel Units. The Channel Units themselves interface with a Base Station Controller (BSC). Under certain circumstances (such as is shown for the cells C and D), the BSC and BTS are dedicated to a specific cell and are therefore referred to as a Base Station (BS). On the other hand, such as the case for cells A and B, while each cell has a dedicated BTS, both BTSs interface with a single BSC. Thus, the term base station or base covers a BTS and BSC whether or not the BSC is dedicated to a particular BTS or is shared over several BTSs. In any event, the BSC interfaces with the MSC which in turn is coupled to the PSTN. As shown in FIG. 37, an MSC can be dedicated to a particular BSC, or on the other hand, multiple BSCs can interface with a single MSC. The interface between a BSC and a BTS can be either T1 or multiple 64 kbps channels. The interface between the BTS and the mobile is preferably as described herein.

Figure 39:
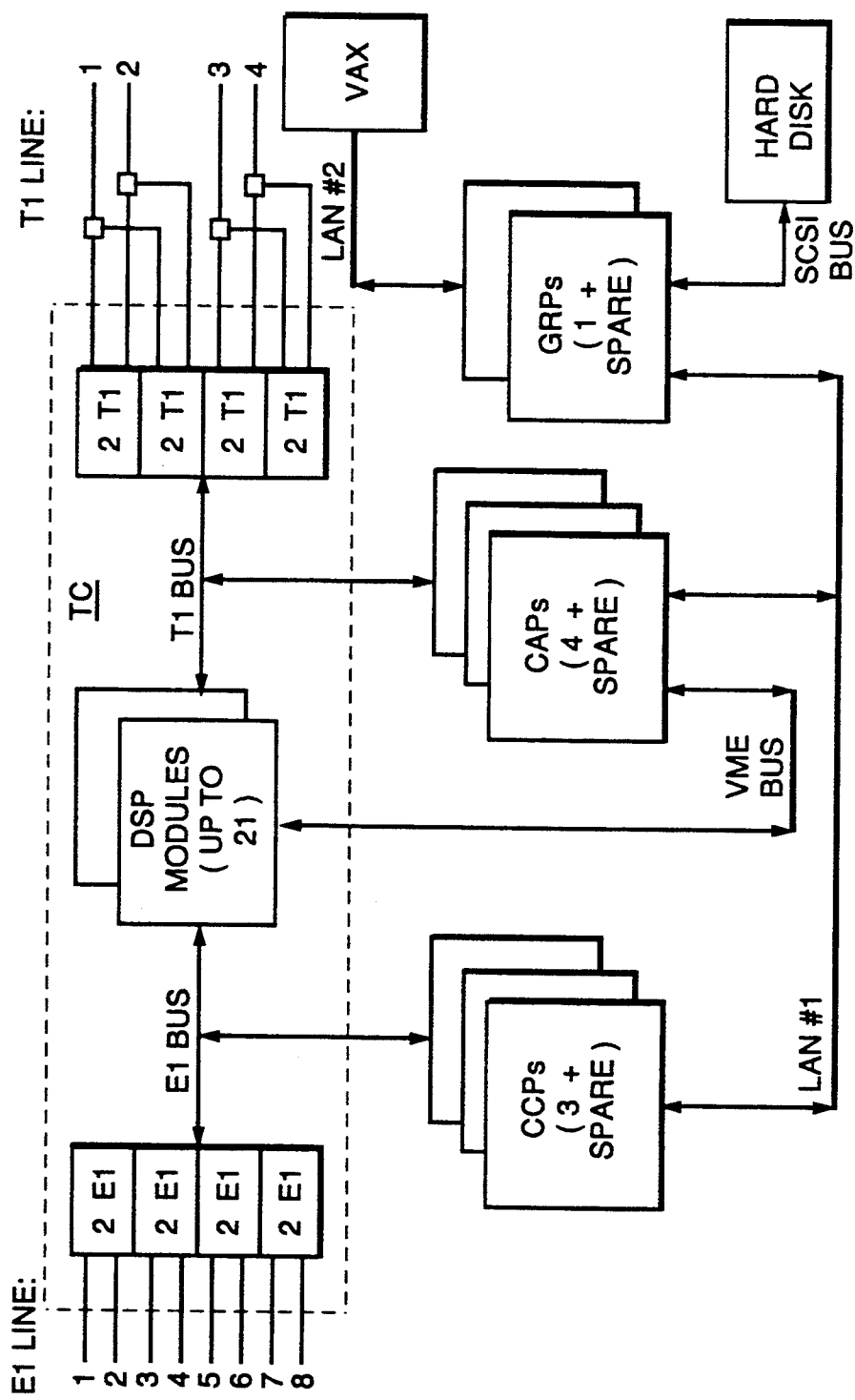
FIG. 39 is a high level block diagram of the BSC of FIG. 37.

A block diagram of the BSC is shown in FIG. 39. The BSC includes at least three interfaces, more generally, two interfaces, one to the MSC, another to an operations and maintenance center and one additional interface per BTS. Referring to FIG. 39, the BTS interface is shown under the heading E1 Line, the MSC interface is shown under the heading T1 Line, and the OMC interface is the LAN#2. The OMC is represented by the VAX, a computer available from Digital Equipment Corporation. The BSC, as shown in FIG. 39, requires three different types of control processors, the Call Control Processor (CCP), a Global Resource Processor (GRP) and a Channel Access Processor (CAP), which is also referred to as a Channel Access Control (CAC). All three of these control processors are implemented on identical hardware modules. The module is generically referred to as a Control Processor Module (CPM). The CPM block diagram is found in FIG. 40, which will be referred to hereinafter.

The CCP performs the following functions:
 (1) It terminates IS-54 per call protocol for a mobile. FACCH/SACCH processing and hand off execution (measurement order message generation, channel quality message processing, communications with MSC for handoff) are all accomplished in the CCP.
 (2) It emulates GSM mobiles for the MSC (connection control and mobility management).
 (3) It emulates a GSM BSC for the MSC (BSS management application part).
 (4) It interfaces with one SS7 channel and performs the following SS7 functions:
  (a) Terminates signaling connection control protocol (SCCP) for the MSC,
  (b) Terminates level 3 of message transfer part,
  (c) Terminates level 2 of message transfer part,
  (d) Performs protocol conversion between IS-54 and GSM protocols.

More than a single CCP can reside in a BSC. When there is more than one CCP per BSC, calls are distributed among the CCPs based on load. The number of CCPs depends on load and redundancy requirements.

The GRP performs the following functions:
 (1) Termination of Forward Analog Control Channel (FOCC) and Reverse Analog Control Channel (RECC). In other words, it interfaces with the analog control channels for the IS-54 interface.
 (2) Performs protocol conversion between GSM and IS-54 protocols for overhead messages.
 (3) Distributes calls among CCPs based on load.
 (4) Communicates with other BSCs in connection with hand off and related procedures.
 (5) Controls T1 and E1 interface cards.
 (6) Provides interface to the OMC and therefore acts as a message router.

There is always one on-line and one back up GRP per BSC. The GRP is equipped with hardware to support a disk interface, i.e. the SCSI bus.

The CAP performs the following functions:
 (1) Terminates E-TDMA protocols for transcoders and mobiles.
 (2) Performs voice channel allocation and deallocation on a speech spurt basis for E-TDMA system calls, and it also does traffic channel assignments for other calls.
 (3) Interfaces with transcoders and forwards power and timing measurements to CCPs.

There can be more than one CAP per BSC. The number of CAPs depends on the number of BTSs served by the BSC. The CAP may control more than a single DSI pool (of RF frequencies). The number of pools in a CAP are equal to the number of BTSs served by the CAP. An on-line CAP sends messages to a back up CAP such that the back up CAP can be used as a hot standby for channel assignments outside the DSI pool.

Figure 40:
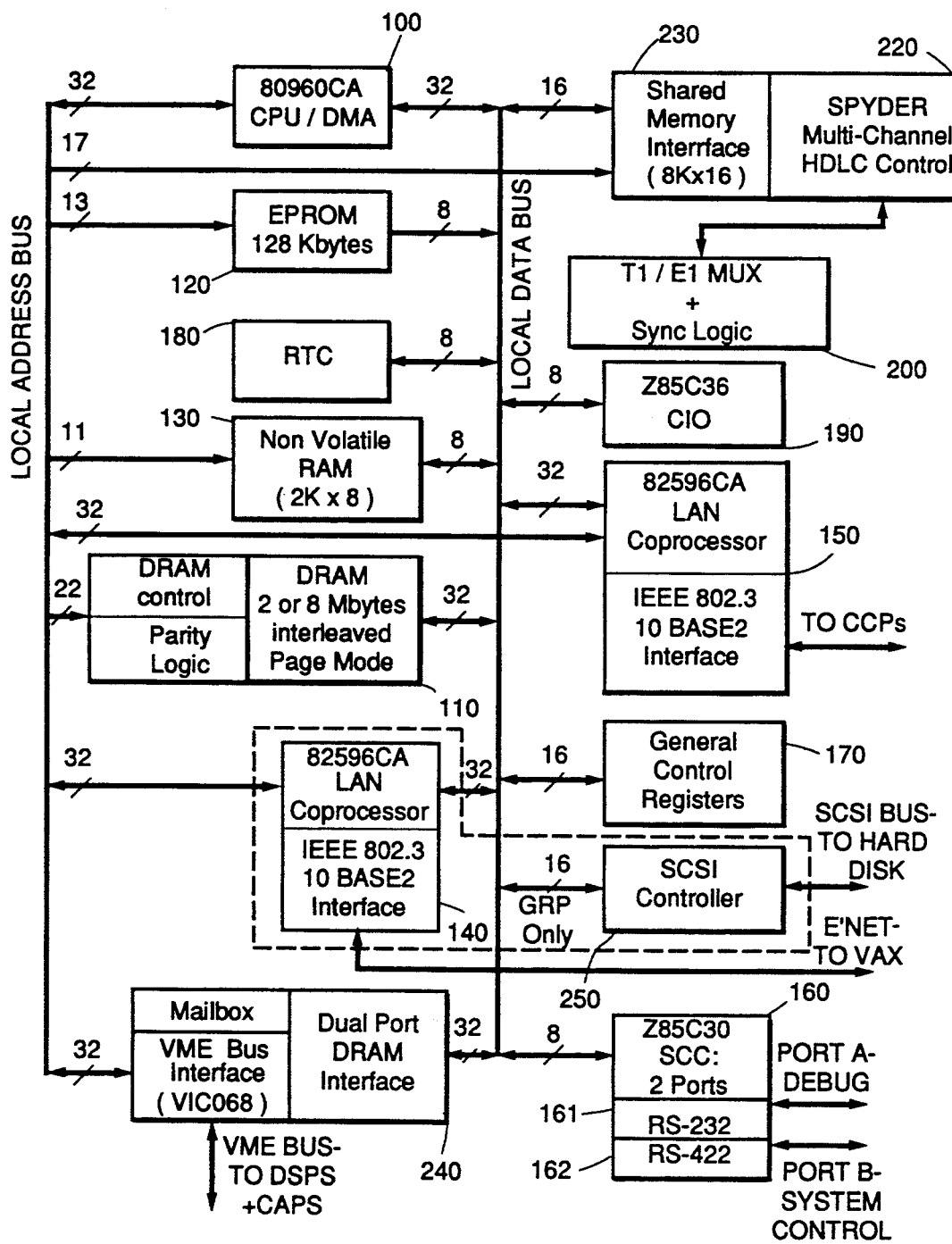
FIG. 40 is a block diagram of a CPM (Control Processor Module) suitable for use as one of the processors of FIG. 39.

Referring to FIG. 40, the architecture for the CCPs, CAPs and GRPs will now be described.

The CPM (Control Processor Module) includes microprocessor 100 comprising, in a preferred embodiment, an Intel 80960 CA 32-bit RISC chip running at 25, 33 or 40 megahertz. Integrated in the microprocessor 100 are four software configurable 32-bit DMA (Direct Memory Access) channels, an interrupt controller, one Kbyte of static data RAM (Random Access Memory), one Kbyte of instruction cache and a programmable register cache for fast context switching. The memory 110 provides 2 or 8 Mbytes of RAM with parity checking on a byte basis. The array is 32-bits wide and supports all possible byte alignments. DRAM (Dynamic RAM) is used and refresh is performed in hardware, transparently to the software. The memory 110 holds all executable software.

The CPM also includes a 32-pin PROM (Programmable Read Only Memory) socket to accommodate a 1 megabit (128K×8) EPROM (Erasable PROM) 120.

The memory further includes a non-volatile static RAM 130 provided in a 2K×8 configuration.

LAN (Local Area Network) controllers 140 and 150 each include an Intel 82596 CA 32-bit intelligent DMA device for handling all aspects of the Ethernet protocol, as well as buffer management for the data portion of LAN packets. The microprocessor 100 controls the LAN chips 140 and 150 by writing linked lists of buffers and commands into main memory. Each LAN controller 140 and 150 generates an interrupt to the microprocessor 100 to signal completion of command sequences. As a CCP or CAP, software activates only one of the LAN controllers 140 and 150 whereas, as a GRP, both LAN controllers 140 and 150 are activated. The LAN controllers 140 and 150 conform to IEEE 802.3 10BASE2 Standard. A serial communication controller 160 comprising a Z85C30 chip, available from Zylog, Inc., provides an RS-232 port 161 and an RS-422 port 162. A set of general control registers 170 interface to the microprocessor 100 for board and system level control functions such as timing selection, data path loop backs, diagnostic circuit enables, hardware configuration and coprocessor control and status monitoring. A real time clock with battery backup 180 is also provided. Programmable timers 190, including a Z85C360 I/O counter timer, available from Zylog, Inc., including three I/O ports and three programmable counters/timers are included. All three timers are software programmable to generate task switching ticks for the board. Each tick causes an interrupt to the microprocessor 100. The three I/O ports provide some of the general control register locations for the board. Multiplexer (mux) and synchronization (sync) logic 200 allows an interface to either T1 or E1 data pipes. The multiplexer portion of the logic 200 selects a single T1 or E1 stream for CPM processing. The sync logic establishes synchronization between the BTS and CAP through the use of an 8 Kbps sync pattern. A programmable amount of time after the start of the 40 ms frame, the first of six equally spaced interrupts, 6.67 ms apart, are generated by the sync logic to the processor 100 so that it may initiate the start of each voice burst in the forward direction.

On the receive side, the mux and sync logic detects the pattern coming back from the BTS and generates a similar sequence of six spaced interrupts, starting a different programmable amount of time later from the reception of the 40 ms frame start mark. A SPYDER chip 220 available from AT&T which is interconnected with the mux and sync logic 200 provides multi-channel HDLC (Hi-Level Data Link Control) functions over either an E1 or T1 pipe. The shared memory interface 230 isolates the SPYDER chip 220 from the local bus to reduce unmanageable short-term bus contention. The shared memory 230 is only large enough to act as a temporary storage of the HDLC packets. The SPYDER chip 220 interrupts the microprocessor 100 at the completion of a transmit or receive data packet operation.

The VME bus is supported by the VICO68 intelligent controller 240, available from Cypress Semiconductor. A CPM incorporates a complete VME implementation including: mastership capability, bus arbiter, interrupt handler, system control functions, mail boxing, support of all transfer sizes and slave functionality that provides an interface into local DRAM. The only capability not supported is block transfers, which are performed more efficiently by the microprocessor's 100 DMA function. The VIC chip 240 generates an interrupt to the microprocessor 100 for a variety of occurrences, most notable mail box interrupts, VME bus IRQ (Interrupt Request) lines going active and VME error conditions.

As a GRP, the CPM interfaces to a SCSI bus with an on-board intelligent controller 250. The SCSI controller 250 generates an interrupt to the microprocessor 100 to indicate changes of bus phase and data transfer completion. One of the microprocessor's DMA channels is dedicated to the controller 250.

Transcoder

The functions of the transcoder TC are:
(1) Voice compression/decompression,
(2) Voice activity detection (VAD)
(3) Idle channel noise measurement and generation,
(4) Interfacing,
(5) Message transport (i.e. FACCH, SACCH messages).

Figure 41:
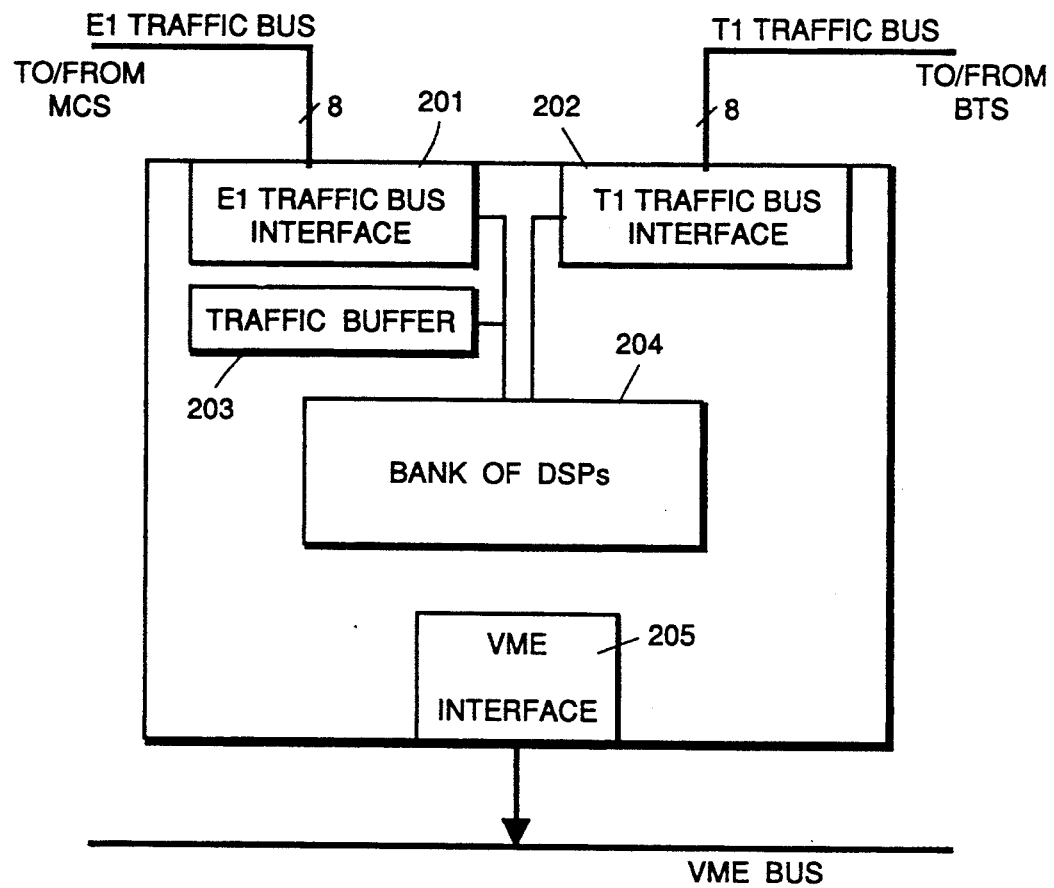
FIG. 41 is a block diagram of the transcoder.

The TC consists of several transcoder modules (TCM) which are identical at the hardware level. Referring to FIG. 39, the TC includes the E1 interfaces, DSP modules, the T1 interfaces and VME interfaces. A TCM is shown in block diagram form in FIG. 41. The interface from the MCS is over the E1 traffic bus which is input to the E1 traffic bus interface 201. The interface to the BTS is over the T1 traffic bus which is input to a T1 traffic bus interface 202. The E1 traffic bus 201 is coupled to a bank of DSPs (Digital Signal Processors)(- which are the DSPs shown in FIG. 39) and also coupled to a traffic buffer 203. The output of the traffic buffer 203 is also coupled to the bank of DSPs, as is the output of the T1 traffic bus interface 202. The DSPs, on the other hand, are coupled to the VME interface 205, which in turn is coupled to the VME bus which is the same VME bus shown in FIG. 39.

The transcoder TC converts speech from the standard 8 Kbytes per second (PCM) to one of four compressed formats. In the opposite direction, the transcoder TC performs the opposite function. The four compressed formats include IS-54 (full rate), IS-54 (half rate), E-TDMA system (half rate) and ADPCM (Adaptive Differential PCM) at 30 Kbps.

The transcoder TC also performs the voice activity detection (VAD) function. VAD monitors a call in the forward direction (originating at the PSTN) and generates an interrupt to a CAP when voice activity starts and ends. The CAP will then allocate or deallocate the traffic channel as required. Regardless of the allocation or deallocation of a traffic channel, the forward PCM samples are either being compressed as voice or monitored for voice activity, at all times. The transcoder generates idle noise when voice is not active. In the reverse direction, idle channel noise measurements are taken at the mobile and are passed to the transcoder TC. From these measurements, the TC generates idle channel noise in the PCM format and passes it to the E1 interface. PCM samples are generated, at all times, either from decoded voice or idle channel noise measurements. In the forward direction, idle channel noise measurements are made and passed to the mobile which will generate the idle channel noise. The E1 traffic bus consists of eight E1 rate channels carrying a maximum of 240 calls at 64 Kbps/call. The E1 traffic bus carries all 240 calls to the transcoder TC. This allows any TCM the connectivity to process any set of forward calls. The T1 interface, on the other hand allows the transcoder TC to process calls from only one channel unit. The T1 interface handles HDLC frames as defined by the BSC-BTS interface. Unlike the E1 and T1 traffic interfaces, the VME interface does not carry any voice data, only control messages are passed on the high speed parallel bus. The messages passed on the VME bus include TC call processing assignments (CAP to TC only), VAD messages (TC to CAP only), FACCH and SACCH messages, mobile control channel messages and analog control channel messages. The traffic buffer 203 is arranged to store approximately one mobile interface frame's data (40 ms) for all 240 forward calls. The bank of DSPs execute the voice compression and decompression algorithms.

Figure 42:
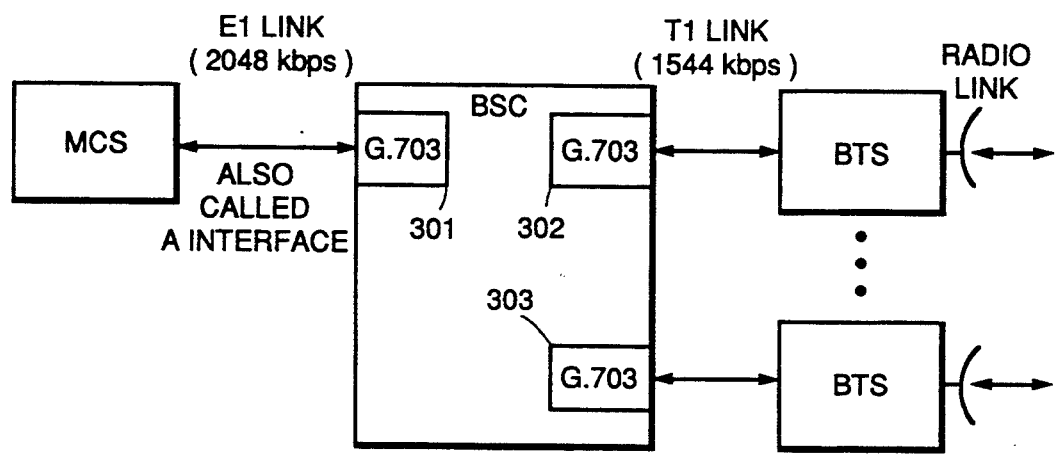
FIG. 42 illustrates the interface between MSC/BSC and BTS, of FIG. 37 particularly with respect to the placement of the G.703 modules.

The physical interface to either the MSC or the BTS is provided by a G.703 I/O module which conforms to CCITT G.703. FIG. 42 indicates the location of the G.703 modules 301, 302 and 303. One module, such as module 301 provides the interface between the BSC and MCS. On the other hand, a G.703 module (such as 302 and 303) is individually dedicated to the interface to each BTS.

Figure 43:
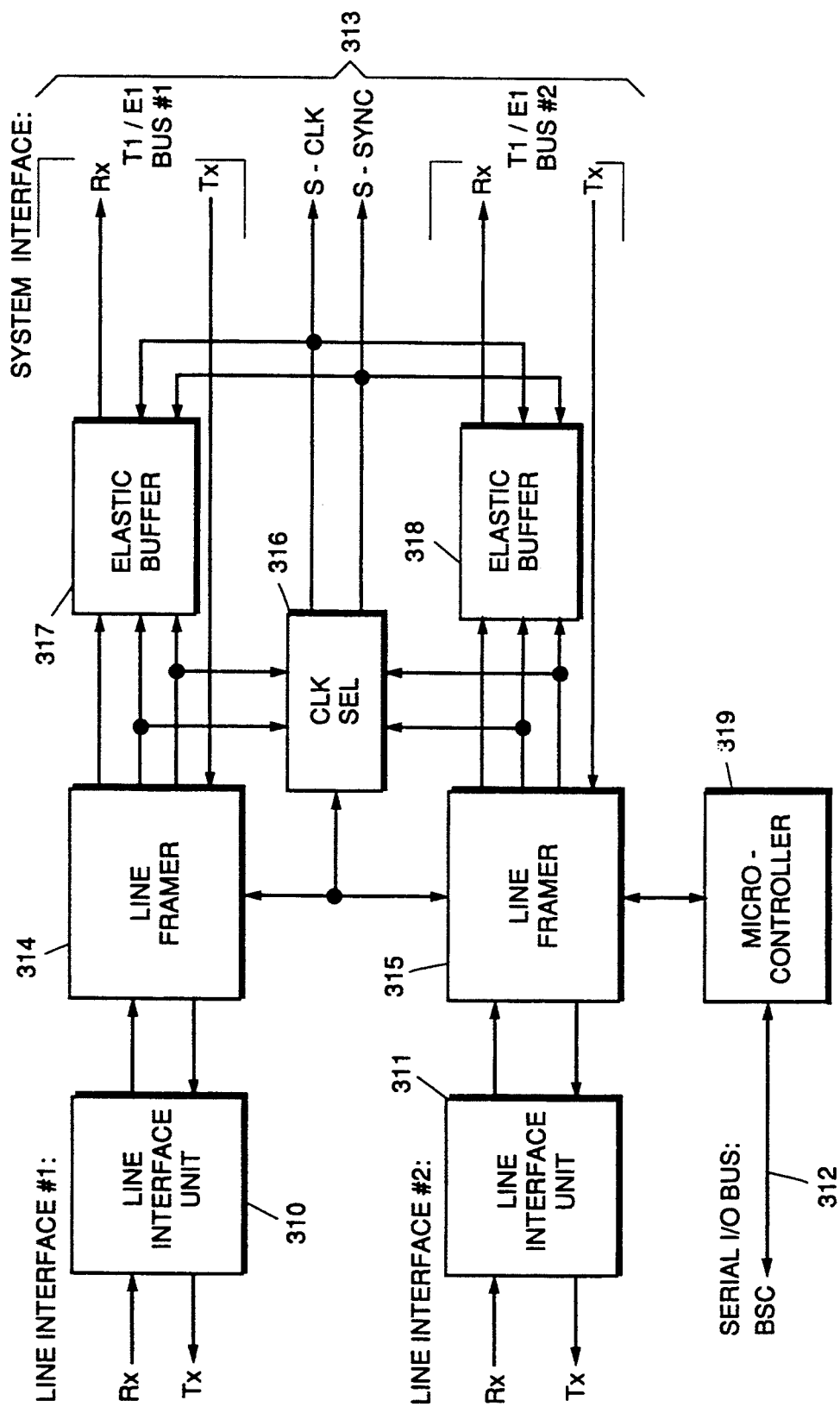
FIG. 43 is a detailed block diagram of a G.703 module of FIG. 42.

FIG. 43 is a block diagram of a G.703 module such as the modules 301–303. As shown in FIG. 43, the module includes line interfaces 310 and 311 which connect to the BSC back plane. The serial I/O bus 312 is the connection between the G.703 module and the GRP. The system interface 313 connects to the DSPs. This interface is a synchronous serial digital data bus carrying RX (received data from the link), TX (data to be transmitted to the link), S-CLK (system clock, derived from one of the links) and S-SYNC (system sync, derived from a T1 or E1 frame boundary). As shown in FIG. 43, the G.703 module includes a line framer 314 and 315, one for each line interface unit, a clock select 316 and elastic buffers 317 and 318. Finally, the microcontroller 319 services the serial I/O bus 312 on the GRP. The microcontroller 319 provides local control and monitoring of the submodule components.

Assignment Function

The assignment function is executed once per slot time to allocate/deallocate forward and reverse traffic slots or channels. In order to accomplish the function, a set of tables is created containing conflict resolution information. Furthermore, the assignment function also must manage the message flow on the control channels. In order to perform the function, reverse allocation requests and deallocation requests from the mobile, forward allocation requests and deallocation requests from the transcoder TC and mobile status (whether or not MAHO is in progress, the present assignment, if any, power status and timing status) are all necessary inputs. In addition, the assignment function requires knowledge of free traffic channels for both forward and reverse traffic, as well as the identity of free control slots for the forward control channel (FC) and RR.

Figure 44:
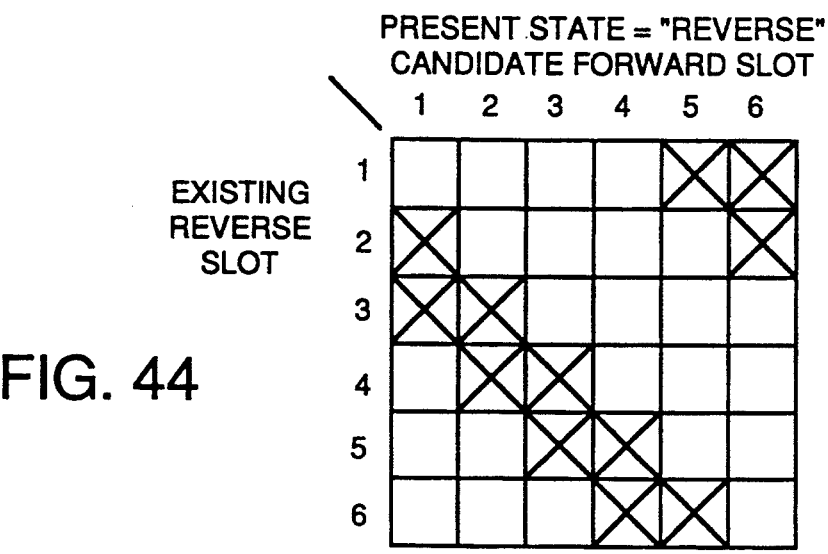
FIGS. 44 and 45 illustrate how a reverse or forward slot assignment impacts selection of a forward or reverse traffic slot, respectively in transmissions according to the present invention.
Figure 45:
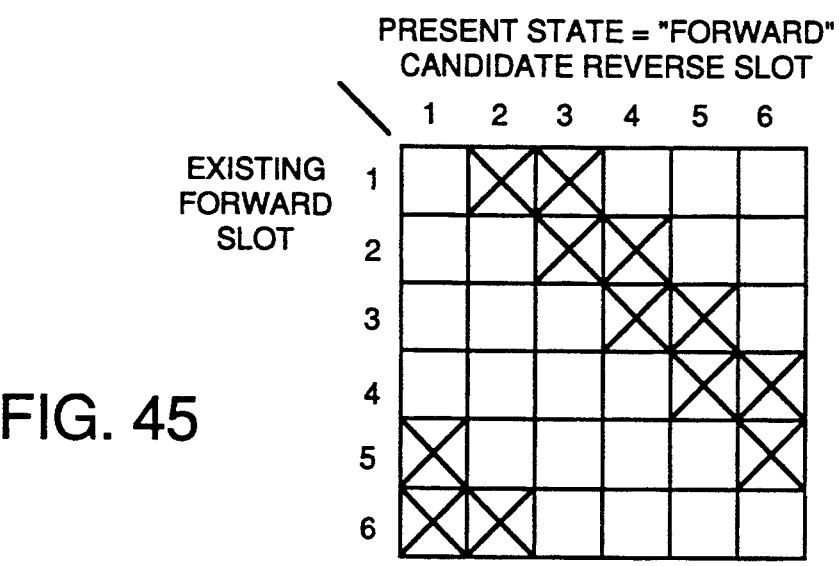

FIG. 44 shows the available forward slots for assigning a forward speech spurt when there is an existing reverse speech spurt assignment for that mobile. Two slots per frame are blocked as shown in the crossed out boxes. Thus, the unmarked boxes in FIG. 44 represent available forward slots for the mobile. FIG. 45 shows the available reverse slots for assigning a reverse speech spurt when there is an existing forward speech spurt assignment for that mobile. In a like fashion, the unmarked boxes in FIG. 45 represent available reverse slots for the mobile.

Figure 46:
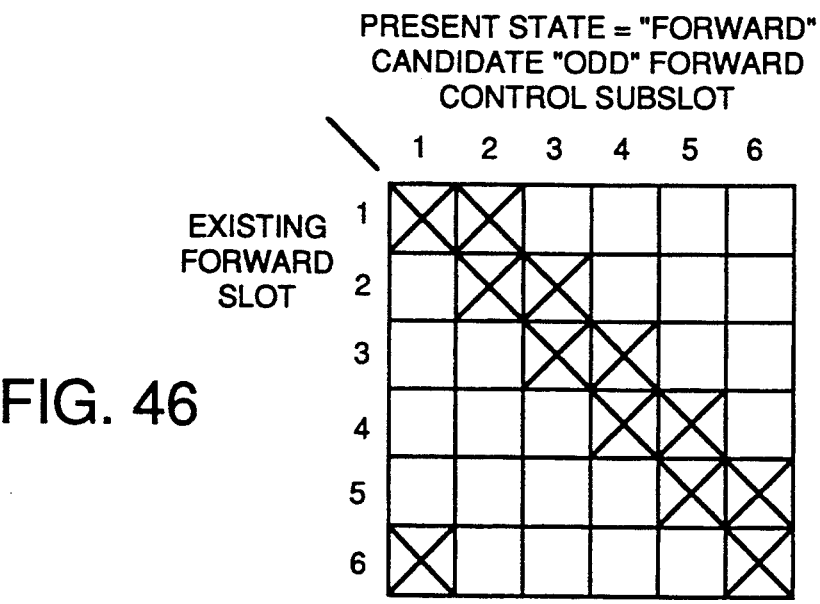
FIGS. 46–57 illustrate how different existing assignments impact the selection of forward control sub-slots in transmissions made according to the present invention.
Figure 47:
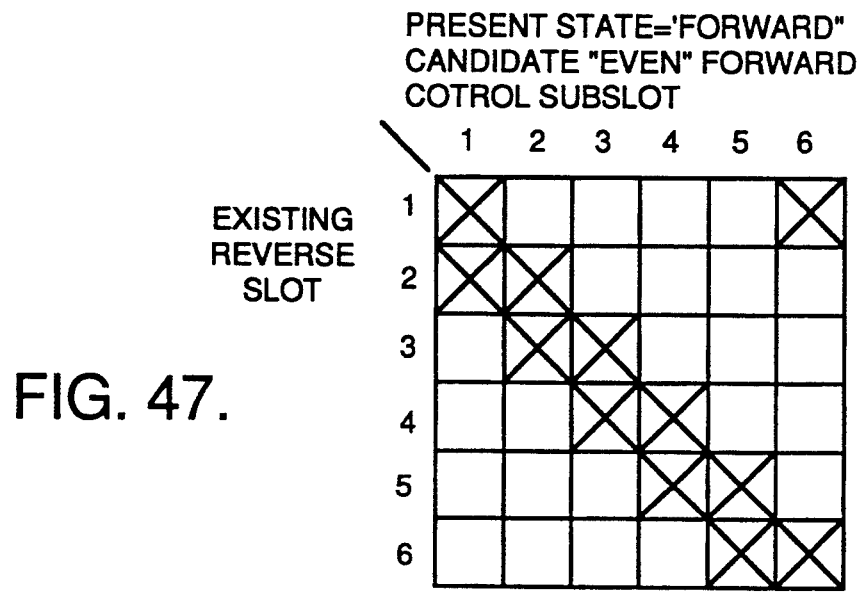
Figure 48:
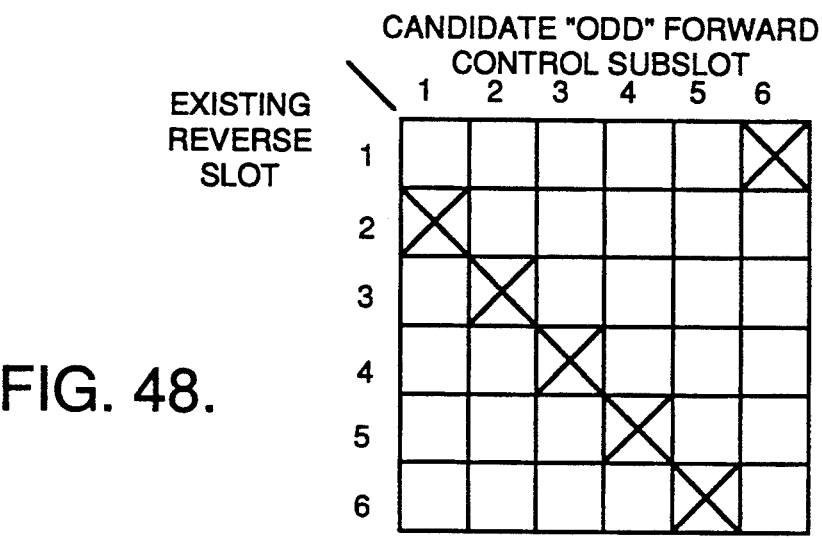
Figure 49:
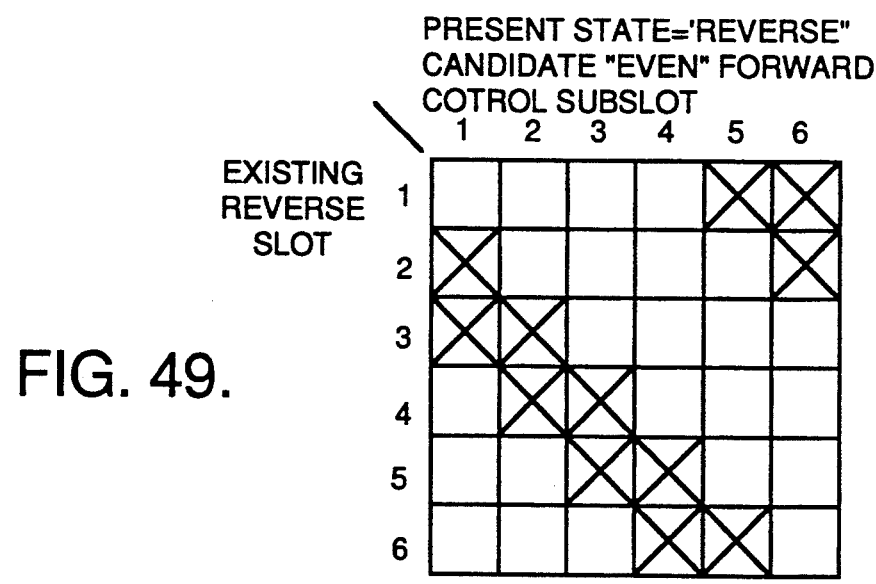

In addition to conflicts caused by speech spurt assignments, a mobile may not be able to listen to all of the forward control sub-slots since it may have to listen to forward voice or send reverse voice. Each mobile is either required to listen to the "even" or "odd" subslots, according to its ID. Where there is an existing forward speech assignment and no reverse speech assignment, FIG. 46 shows the usable "odd" sub-slots and FIG. 47 shows the usable "even" sub-slots.

Where there is an existing reverse speech assignment and no forward speech assignment, FIG. 48 shows the usable "odd" sub-slots and FIG. 49 shows the usable "even" sub-slots.

Figure 50:
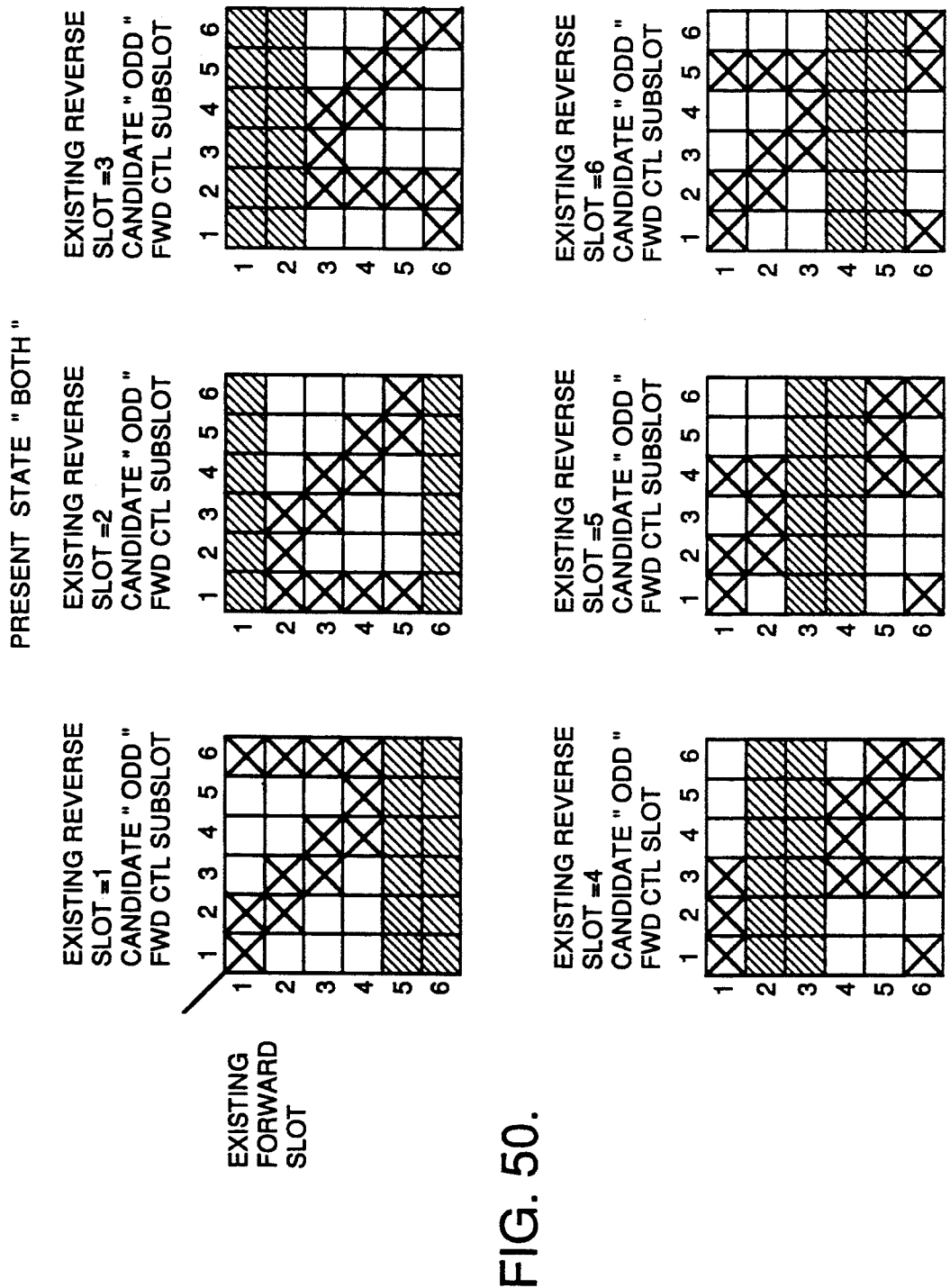
Figure 51:
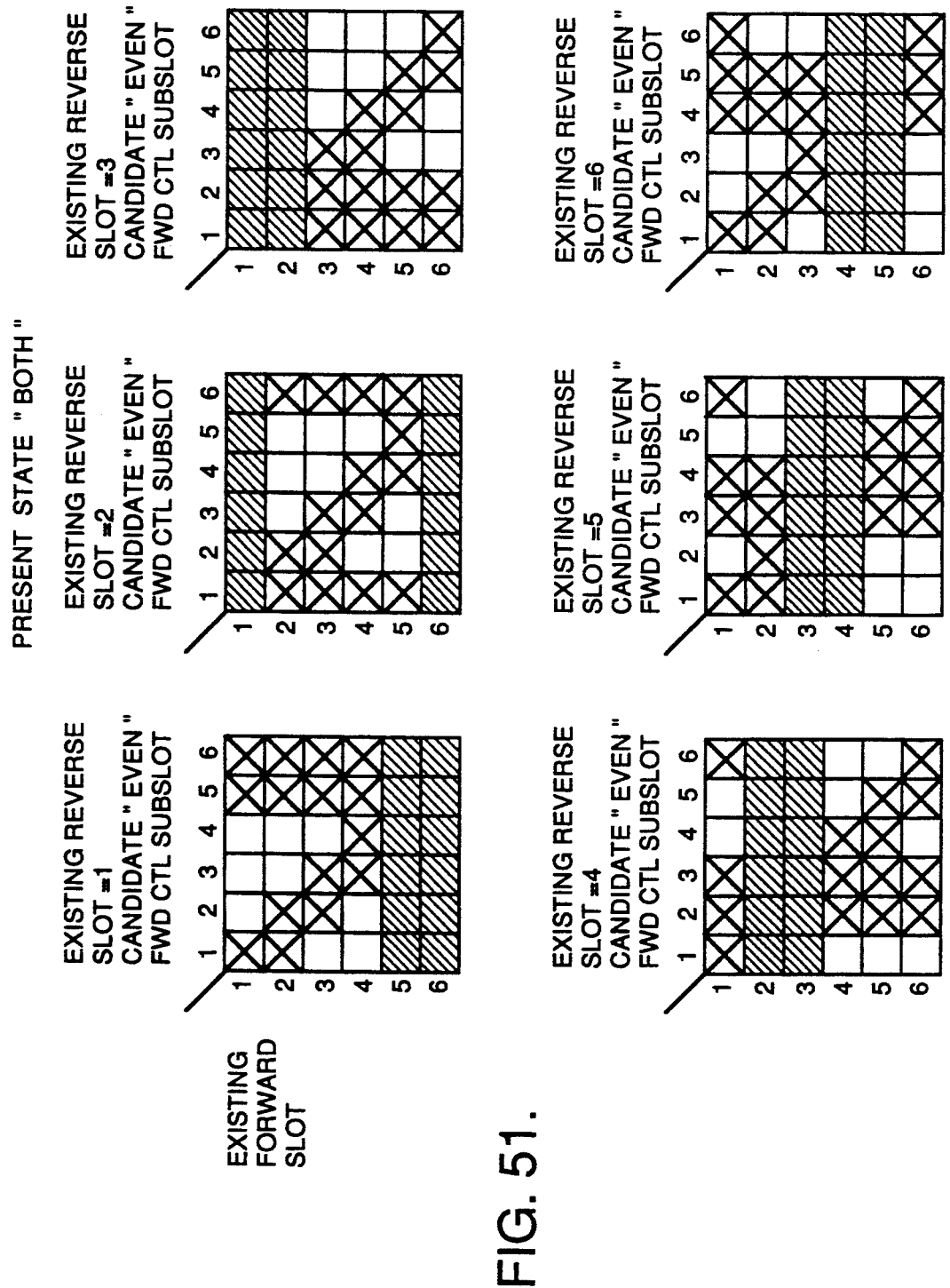

In the case of double talk, "odd" and "even" control sub-slots are at a premium, as is illustrated in FIGS. 50 and 51. In FIGS. 50 and 51, the crossed out sub-slots are blocked whereas the blackened blocks represent double talk assignments which cannot be made.

Figure 52:
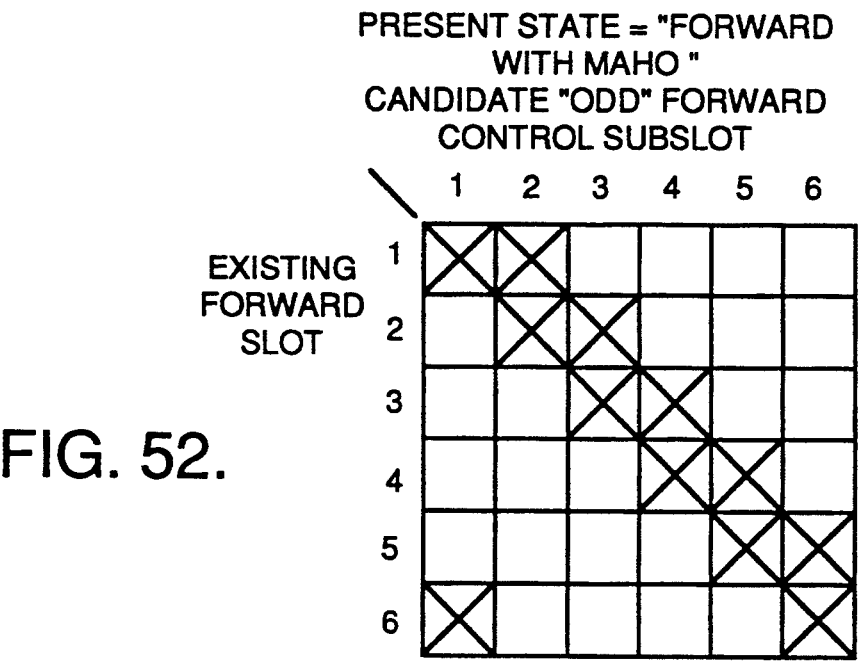
Figure 53:
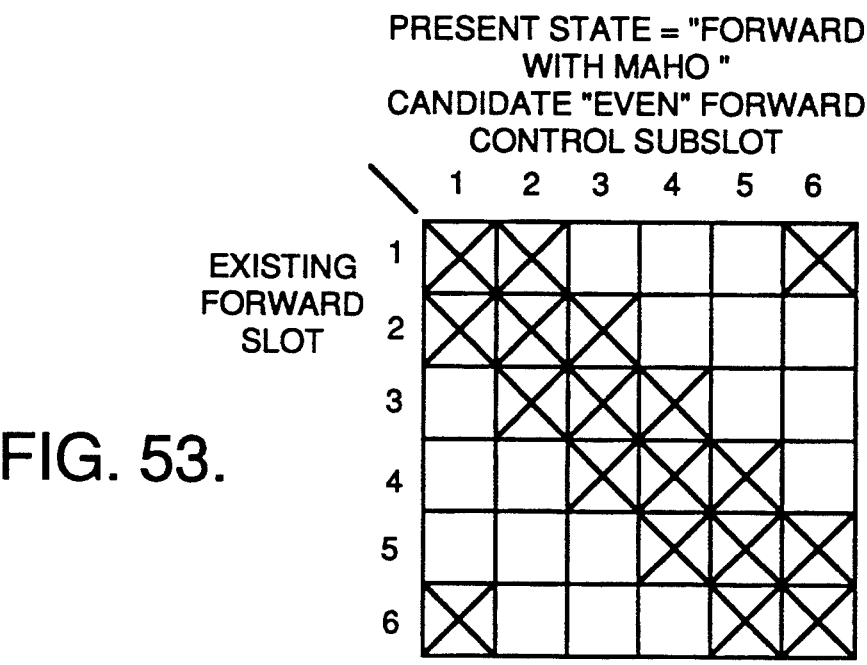

When mobile assisted handoff is introduced, the control sub-slot options are further constrained. FIGS. 52 and 53 show the available sub-slots when the mobile is performing mobile assisted handoff and a forward speech slot is assigned. FIGS. 52 and 53 are drawn on the assumption that mobile assisted handoff is done once per frame in the slot following the assigned slot.

Figure 54:
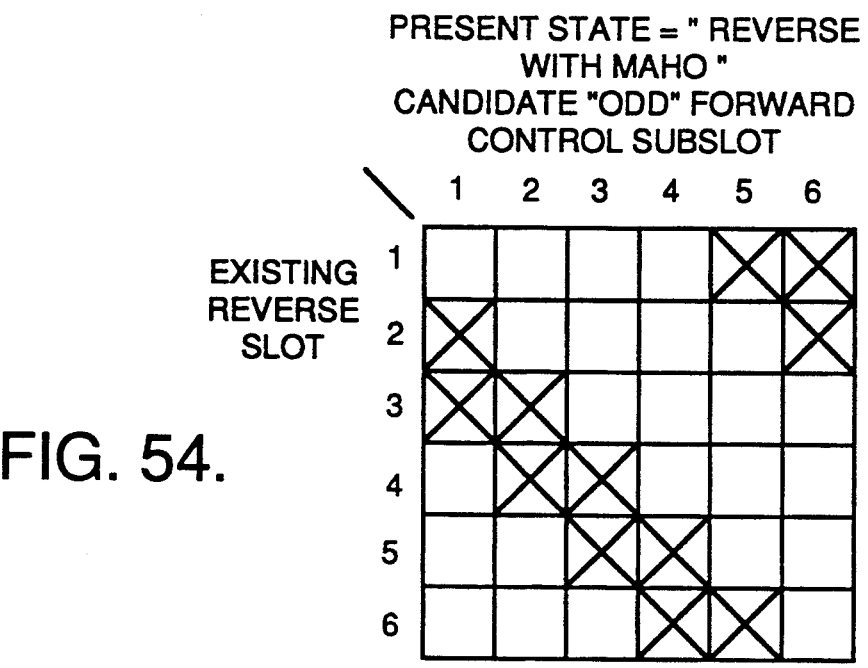
Figure 55:
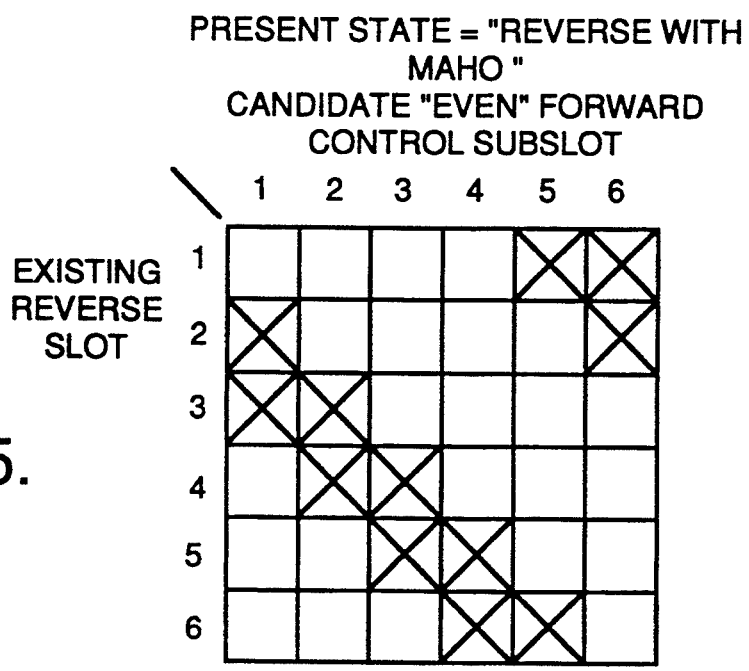

FIGS. 54 and 55 show the available sub-slots when the mobile is performing mobile assisted handoff and a reverse speech slot is assigned.

Figure 56:
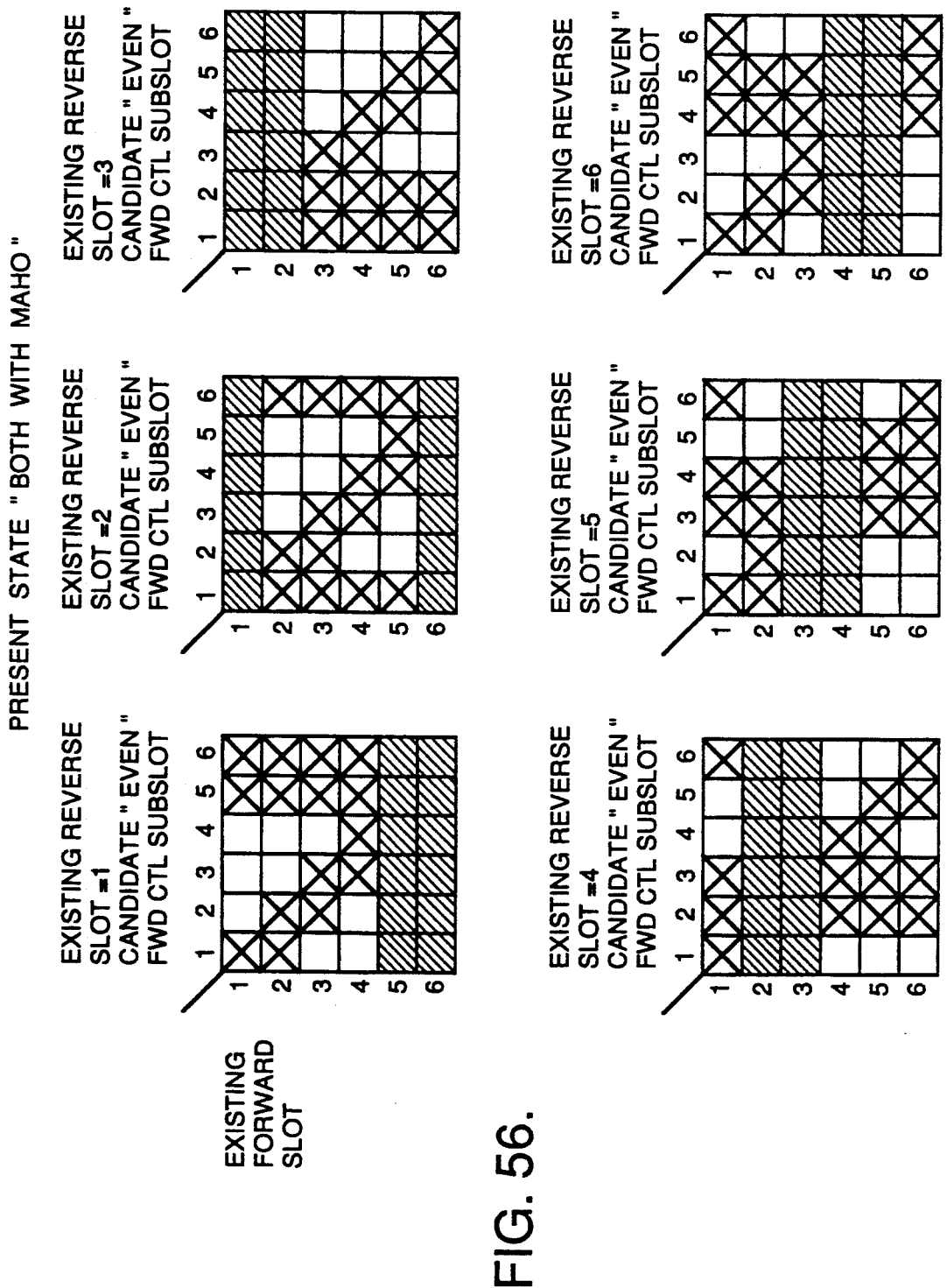
Figure 57:
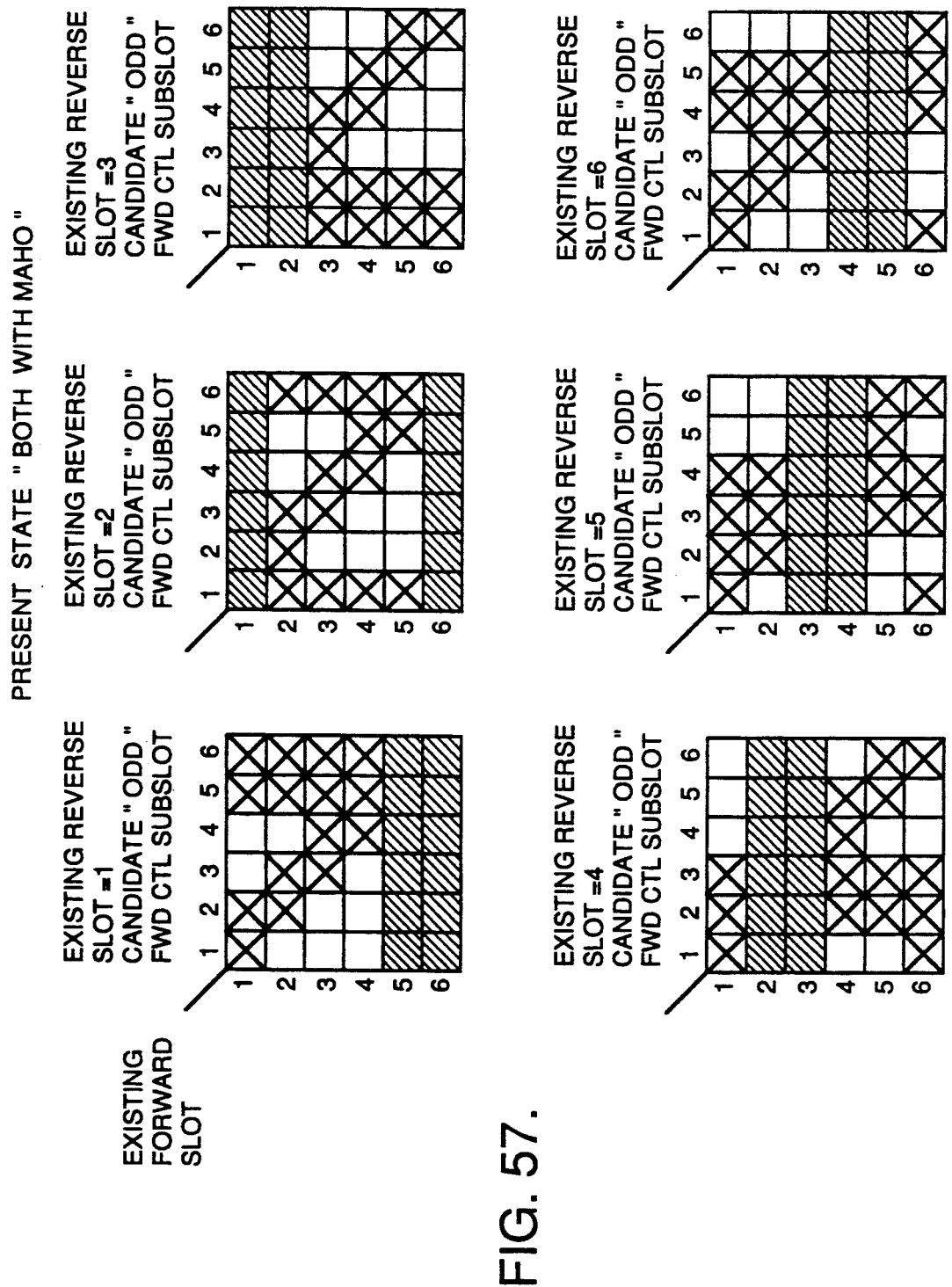

Finally, when both speech spurt directions are assigned and the mobile is also performing mobile assisted handoff, the candidate even and odd sub-slots are shown in FIGS. 56 and 57. The information presented in FIGS. 44-57 provides the basis for the plurality of look-up tables which are used, in combination with the present status of the mobile, to determine the identity of free control slots. This information, along with the status of unassigned traffic channels, can then determine the identity of free traffic channels for both forward and reverse traffic.

Prior to execution, allocate requests and deallocate requests are placed in a queue when received. The first step in the process reviews deallocate requests in order to release as many channels as possible, i.e. to extend the length of the free channel list. Thereafter, each allocate request is processed to determine both the identity of an appropriate control channel for the assignment message and an appropriate traffic channel. This processing makes extensive use of the various tables based on the information contained in FIGS. 44-57.

Control channel assignments are forwarded from the assignment allocation to the base station for transmission of the appropriate message to the mobile. The identity of forward traffic channels are sent both to the base station (for transmission to the mobile) and to the transcoder so that the transcoder can place the processed voice into the appropriate forward channel for receipt by the mobile. Likewise, the identity of reverse traffic channels are forwarded to the base station for transmission to the mobile and are also forwarded to the transcoder so that the transcoder can process the half rate voice into PCM for transmission to the PSTN.

FIG. 13 is a block diagram of the mobile. As shown, the mobile includes a handset controller 810, a baseband module 820, a radio module 830 and an appropriate antenna 840. The handset controller includes a microphone 811, a speaker 812, a keypad 813 and a display 814. Voice information from the microphone 811 is coupled to the baseband module 820. Receive voice (analog) is coupled from the baseband module 820 to the speaker 812. Optionally, audio input/output devices other than the microphone 811 and speaker 812 could also be used. The handset 810 includes a keypad 813 for control, e.g., such as for dialing. Keyboard data is forwarded from the handset 810 to the baseband module 820. The handset also includes a display 814 and display control information is forwarded from the baseband module 820 to the handset 810. The radio module 830 receives processed transmit information (analog), AGC and VCO control information from the baseband module 820. In turn, the radio module 830 provides receive information (analog) to the baseband module 820. The baseband module 820 is shown in more detail in FIG. 38. As shown in FIG. 38 the baseband module 820 includes three Digital Signal Processing (DSP) chips 8201, 8202 and 8203. Chip 8201 is a conventional Texas Instruments C31 for performing the voice analysis, voice synthesis, echo control and voice recognition. Chip 8202 is a TI chip C50 performing an equalization function. Chip 8203 is another TI chip (either a C50 or 51) providing for modem, decoder, encoder, FEC and call processing functions. The other major component of the baseband module 820 is the ASIC (Application Specific Integrated Circuit) 8204. ASIC 8204 performs modem filtering, timing and bus decoding functions. The modem and timing functions are specified by published standards (IS-54). In other respects the ASIC 8204 is similar to the ASIC in the IMM Ultraphone medium range microwave telephony system. An audio interface 8205 is coupled between the handset controller 810 (and perhaps other audio input/output devices on the one hand, and a Codec (coder/decoder) 8206, as well as the ASIC 8204. Codec 8206 in turn is coupled to a serial channel S1 which provides connections between the Codec 8206 and the chips 8201 and 8203. A second serial channel, S2, is connected to the chip 8203 and the ASIC 8204, as well as to EPROM 8207 and SRAM (Static RAM) 8208. The serial channel S2 is also connected to isolation logic 8209 and 8210. Isolation logic 8209 is coupled to the chip 8201 and to its associated SRAM 8211, whereas the isolation logic 8210 is coupled to the chip 8202. Outputs from the ASIC 8204 provide inputs to the radio module 830 via DACs (digital to analog converters) 8212, 8213 and 8214. On the other hand, received information (analog) is coupled via the ADC (analog to digital converter) 8215 to the ASIC 8204.

The major portion of the processing (both voice and control) is performed by the chips 8201, 8202, 8203 and 8204 using software which is available to those chips from the memory (8207, 8208, 8211). The master is the 8203. The handset 810 includes a microprocessor (such as the TMS 370Cx10 made by Texas Instruments) for interpreting inputs from the keypad 813, for driving the display 814.

The major functions of the baseband module 820 include voice processing to support half rate encoding, responding to voice detection for initiating reverse traffic channel requests, responding to reverse channel assignments the radio module 830, half rate voice decoding in the forward direction, responding to forward channel assignments and the TDMA timing functions. The baseband module 820 also includes peripheral components including a call interface 8217 and bus interface 8218, a PCU interface 8219 and the debug interface 8220. The channel selection burden placed on the mobile is considerably lessened as compared to the channel selection obligations of the base station. In the first place, the mobile does not perform traffic channel selection at all. Forward and reverse traffic channels are assigned by the base station and received in the form of control messages at the mobile. The mobile need only therefore tune to the appropriate carrier frequency and slot to either transmit and/or receive. Likewise, the mobile does not have to perform any selection process for the Reverse Response sub-slot inasmuch as that selection is also implemented at the base station and transmitted to the mobile in the form of a command. The mobile does, however, have to select control subslots for the reverse aloha (RA) transmissions. Typically the mobile will not have a reverse channel assignment at the time it is preparing to transmit a reverse allocation request. It may, however, have a forward traffic assignment which, as has been referred to above, will exclude certain sub-slots from candidates for RA transmission. Having determined which sub-slots are excluded (described above) the mobile need then only select the appropriate slot and sub-slot within that slot for the RA transmission. During the DSI pool entrance phase, the mobile has had provided to it a list of carrier frequencies and control slots in the pool. With this information, it is a simple task for the mobile to (1) select three candidate slots for the RA transmission and, within each candidate slot to (2) select one of the three RA sub-slots. The slot selection, among the available slots, is determined in accordance with a predetermined selection criterion. For example, the first three available slots is one criterion, an alternative criterion would be making three slot selections from the succeeding three pairs of available slots. A sub-slot selection is random. Prior to transmitting each RA, however, the mobile must also select the power level between upper and lower thresholds. This power selection is also a random selection. Having selected the carrier frequency, RA sub-slot and power level for each transmission, the transmission is then implemented.

While an exemplary embodiment of the invention has been described herein, those skilled in the art will understand that the various component identifications and parameters which have been identified are exemplary and that many changes can be made within the spirit and scope of the invention. For example, the diversity parameter (the number of times a given message is repeated) is not necessarily constant even over a single system or even over a single cell. For example there may be a difference between forward and reverse diversity. More particularly reverse diverse messages (RevAllocReq) may be repeated 3 times while forward diverse messages (FwdAsgn) may be repeated twice. As another example, the diversity parameter may vary with the mobile, say based on distance from the cell site. In other words, a mobile close to the cell site may use double transmission and mobiles further from the cell site may use triple transmissions. Therefore the scope of the invention should be construed in accordance with the claims appended hereto.

What is claimed is:

1. In a radio telephony system having a plurality of transmitting stations, each station transmitting information bursts to another station, the bursts being transmitted on radio carrier frequencies divided into time slots for carrying the information bursts wherein delays of undetermined duration may occur between subsequent information bursts, a method for generating an adjustment request regarding the power with which the information bursts are transmitted from a transmitting station to a receiving station comprising:

detecting an information burst transmission at the receiving station;

measuring the time which elapses following the detected information burst;

comparing the elapsed time with a predetermined threshold value;

if the elapsed time exceeds the threshold, requesting a further transmission from the transmitting station;

if a response is received to the request for a further transmission, measuring the power of the received response;

transmitting to the transmitting station a control message for requesting an adjustment to the transmission power level in response to the measurement.

2. The method as recited in claim 1 wherein the step of requesting a further transmission comprises selecting a time slot from among a plurality of control channels, each control channel comprising an identified sequence of time slots, the control channel time slots being excluded from slots for transmission of information bursts.

3. The method as recited in claim 2 wherein each control channel is transmitted on a different carrier frequency.

4. The method as recited in claim 2 further comprising the step of also transmitting the request in a time slot of a second control channel.

5. The method as recited in claim 1 wherein the step of requesting a further transmission further comprises identifying an information channel for the transmission, the information channel comprising a predetermined sequence of time slots.

6. The method as recited in claim 1 wherein the time slots are grouped into channels each channel comprising an identified sequence of time slots, the method further comprising, before the step of selecting a first slot, the step of transmitting an identification of each channel within a predetermined set of channels for use in transmitting information between the stations.

7. The method as recited in claim 6 wherein the step of transmitting an identification further comprises transmitting an abbreviated code for identifying channels in subsequent transmissions and an abbreviated code for station identification in subsequent transmissions.

8. The method as recited in claim 1 wherein the information burst comprises a speech spurt.

9. The method as recited in claim 8 wherein the step of detecting an information burst comprises detecting speech.

10. The method as recited in claim 1 wherein the transmitting station comprises a cellular telephone subscriber unit.

11. The method as recited in claim 1 wherein the receiving station comprises a cellular telephony base station and base station controller.

* * * * *